(12) United States Patent
Park et al.

(10) Patent No.: US 8,924,753 B2
(45) Date of Patent: Dec. 30, 2014

(54) APPARATUS AND METHOD FOR ADAPTIVE FREQUENCY SCALING IN DIGITAL SYSTEM

(75) Inventors: Tae-Hong Park, Seoul (KR); Ji-Yong Yoon, Suwon-si (KR); Kang-Min Lee, Suwon-si (KR); Yun-Ju Kwon, Yongin-si (KR); Jong-Hyuck Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 602 days.

(21) Appl. No.: 13/276,503

(22) Filed: Oct. 19, 2011

(65) Prior Publication Data

US 2012/0102345 A1 Apr. 26, 2012

(30) Foreign Application Priority Data

Oct. 20, 2010 (KR) ........................ 10-2010-0102270

(51) Int. Cl.
*G06F 1/00* (2006.01)
*G06F 1/32* (2006.01)

(52) U.S. Cl.
CPC ............. *G06F 1/324* (2013.01); *Y02B 60/1235* (2013.01); *G06F 1/3253* (2013.01); *G06F 1/3215* (2013.01); *G06F 1/3228* (2013.01)
USPC .......................................... 713/322; 710/110

(58) Field of Classification Search
CPC ...................................................... G06F 1/324
USPC ........................................................ 713/322
See application file for complete search history.

(56) References Cited

U.S. PATENT DOCUMENTS

| | | | | |
|---|---|---|---|---|
| 7,296,169 B2 * | 11/2007 | Cheng et al. | ................... | 713/322 |
| 7,500,124 B2 * | 3/2009 | Seo | ............... | 713/322 |
| 7,865,749 B2 * | 1/2011 | Sandon et al. | ................ | 713/322 |
| 7,975,161 B2 * | 7/2011 | Kahn | ............. | 713/500 |
| 8,250,394 B2 * | 8/2012 | Agrawal | ....................... | 713/322 |
| 8,694,811 B2 * | 4/2014 | Raju et al. | ..................... | 713/320 |
| 2011/0106992 A1 * | 5/2011 | Lee et al. | ...................... | 710/110 |

\* cited by examiner

*Primary Examiner* — Brian Misiura

(74) *Attorney, Agent, or Firm* — Jefferson IP Law, LLP

(57) ABSTRACT

An apparatus and method for adaptively changing clock frequencies of a Central Processing Unit (CPU) and a bus in a digital system are provided. The system includes an Adaptive Frequency Scaling (AFS) controller and a clock controller. The AFS controller determines whether to change a clock frequency of the CPU according to operation information of the CPU, and determines whether to change a clock frequency of the bus according to operation information of the bus. The clock controller generates a clock frequency of the CPU and a clock frequency of the bus according to the determination of the AFS controller.

33 Claims, 13 Drawing Sheets

APPARATUS AND METHOD FOR ADAPTIVE FREQUENCY SCALING IN DIGITAL SYSTEM

PRIORITY

This application claims the benefit under 35 U.S.C. §119(a) of a Korean patent application filed in the Korean Intellectual Property Office on Oct. 20, 2010 and assigned Serial No. 10-2010-0102270, the entire disclosure of which is hereby incorporated by reference.

BACKGROUND OF THE INVENTION

1. Field of the Invention

The present invention relates to a digital system. More particularly, aspects of the present invention relates to an apparatus and method for adaptively changing clock frequencies of a Central Processing Unit (CPU) and a bus in a digital system.

2. Description of the Related Art

Recently, a Dynamic Voltage and Frequency Scaling (DVFS) technology is being applied to Personal Computer (PC)-class Central Processing Units (CPUs) and some embedded processors. The DVFS technology measures or estimates an activity of a CPU and changes a clock frequency of the whole CPU or system.

However, the DVFS technology measures only operation information of a CPU itself and changes only a voltage and clock frequency of the CPU. As a result, a range of power reduction is restricted to the CPU. In addition, a function block requiring a bandwidth of an independent bus other than the CPU may be present, and, in this case, a problematic phenomenon occurs in which system performance is in fact reduced by the CPU-centered DVFS technology.

SUMMARY OF THE INVENTION

Aspects of the present invention are to address at least the above-mentioned problems and/or disadvantages and to provide at least the advantages described below. Accordingly, an aspect of the present invention is to provide an apparatus and method for changing a clock frequency and reducing system power consumption in a digital system.

Another aspect of the present invention is to provide an apparatus and method for adaptively changing clock frequencies of a Central Processing Unit (CPU) and a bus in a digital system.

Another aspect of the present invention is to provide an apparatus and method for adaptively changing clock frequencies of a CPU and a bus considering an activity of the CPU in a digital system.

Another aspect of the present invention is to provide an apparatus and method for adaptively changing clock frequencies of a CPU and a bus considering an activity of the bus in a digital system.

Another aspect of the present invention is to provide an apparatus and method for adaptively changing a clock frequency considering function blocks using a bus clock in a digital system.

The above aspects are achieved by providing an apparatus and method for adaptive frequency scaling in a digital system.

In accordance with an aspect of the present invention, a system having a CPU and a bus is provided. The system includes an Adaptive Frequency Scaling (AFS) controller and a clock controller. The AFS controller determines whether to change a clock frequency of the CPU according to operation information of the CPU, and determines whether to change a clock frequency of the bus according to operation information of the bus. The clock controller generates a clock frequency of the CPU and a clock frequency of the bus according to the determination of the AFS controller. When the AFS controller determines to increase the clock frequency of the bus into a first value, if the first value is greater than a current clock frequency of the CPU, the AFS controller requests the clock controller to change the clock frequency of the bus to the first value and the clock frequency of the CPU to a value greater than or equal to the first value.

In accordance with another aspect of the present invention, an operation method of a digital system having a CPU and a bus is provided. The method includes determining whether to change a clock frequency of the CPU according to operation information of the CPU, determining whether to change a clock frequency of the bus according to operation information of the bus, when determining to increase the clock frequency of the bus to a first value, determining whether the first value is greater than a current clock frequency of the CPU, and, if the first value is greater than the current clock frequency of the CPU, changing the clock frequency of the bus to the first value and changing the clock frequency of the CPU to a value greater than or equal to the first value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will become more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
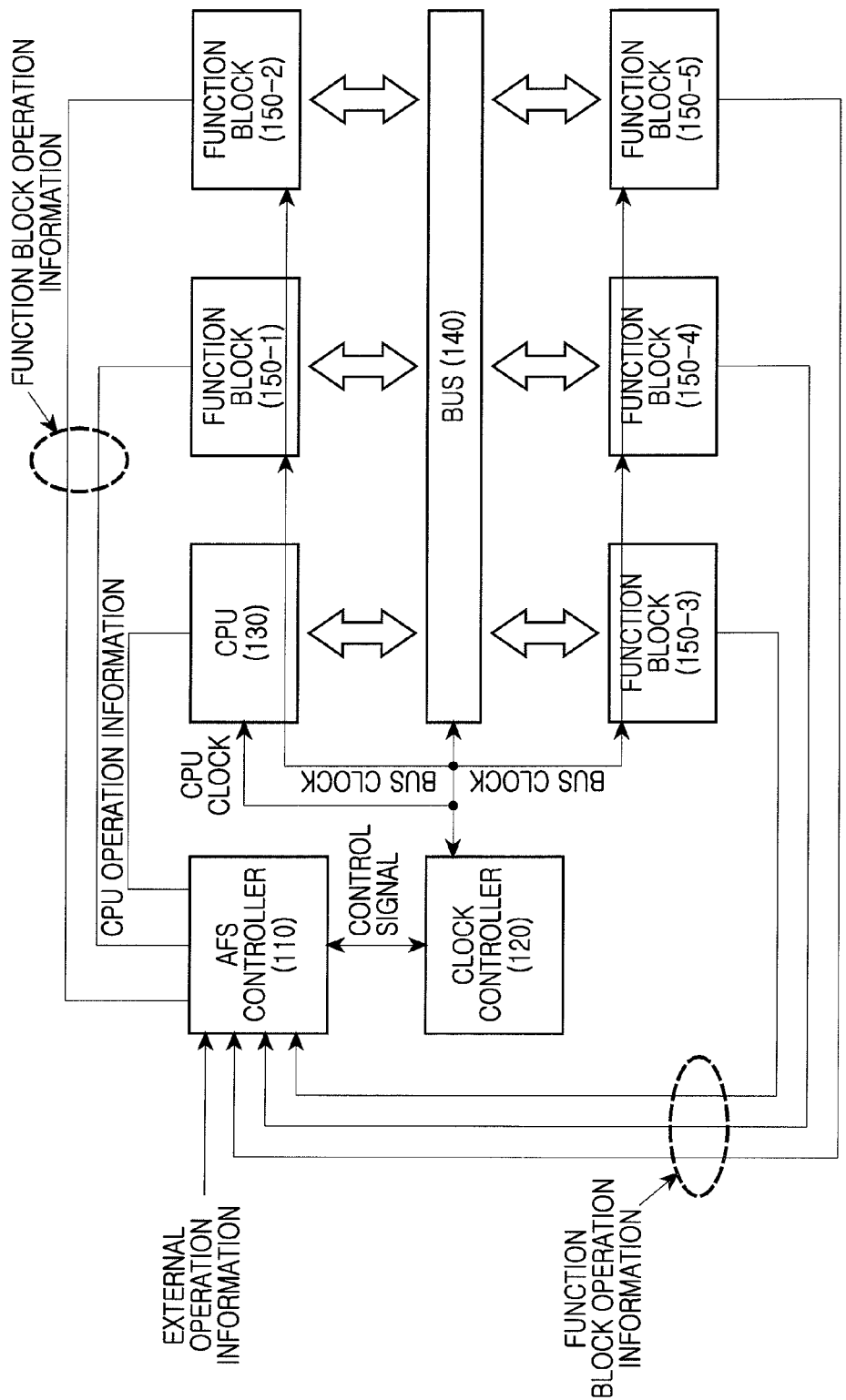
FIG. 1 is a block diagram illustrating a construction of a digital system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a technology for adaptively changing clock frequencies of a Central Processing Unit (CPU) and a bus in a digital system.

Clock frequencies of a CPU and a bus are closely associated with each other. When only one frequency is changed, the change is limited to a current clock frequency of the other, in order to minimize influence exerted on the other. As a result, a range of power reduction is restricted. In a widely used synchronous system, the relationship between clock frequencies of a CPU and a bus has been defined. Generally, the clock frequency of the CPU should be faster and be the same as the clock frequency of the bus. In this condition, problems of individual scaling of the clock frequencies of the CPU and bus are given as follows.

Firstly, at the time of Dynamic Voltage and Frequency Scaling/Adaptive Frequency Scaling (DVFS/AFS) for a CPU, where it is intended to decrease a clock frequency of the CPU due to a decrease in activity of the CPU, a maximum value of a reducible clock frequency of the CPU is a maximum value of a clock frequency of a bus. If the clock frequency of the CPU drops below the clock frequency of the bus, the relationship between the clock frequencies of the CPU and the bus goes sour, so normal operation is not performed.

Secondly, at the time of DVFS/AFS for a bus, where it is intended to increase a clock frequency of the bus due to an increase in activity of the bus, a maximum value of the clock frequency of the bus is a current clock frequency of a CPU according to the relationship between the CPU and bus clock frequencies.

In addition, respective function blocks using a bus as a data transmission path are closely associated with the bus. Accordingly, when a clock frequency of the bus is changed unilaterally, the performance of the function blocks are not guaranteed. This is because changing a clock frequency of a bus based on only an activity of the bus assumes the premise that 'if activity of bus is less, activity of module operating by bus clock within function block is less too'. In some circumstances, however, a function block uses a bus clock for the sake of pre-processing, before actually transmitting data through the bus. As a result, at the time of the pre-processing, if a clock frequency of the bus is low, the performance of the function block can be deteriorated.

Where a CPU, a bus, and function blocks have been realized in a System on a Chip (SoC), the aforementioned problem can take place not only within the SoC but also in an Interface (I/F) with other Application Processors (APs) external to the SoC. Clock frequencies of the CPU and bus not only affect internal operations of the SoC but also affect the performance of other APs. For example, where there is an I/F between an AP and a modem chip, a clock frequency of a bus can affect the AP. Because a clock source within a system is restricted, a simple I/F such as the I/F between the AP and the modem chip often shares an operation clock and a bus clock. Accordingly, it is desirable to consider even an operation of the external AP at the time of a change of the clock frequencies of the CPU and bus.

Where the clock frequencies of the CPU and the bus in the SoC internal have changed, it is desirable to consider external circumstances as well as the SoC, such as an operation state of the CPU, an operation state of the bus, an operation state of the function block, and the like. Simply scaling a frequency on the basis of activities of the CPU and the bus is not desirable.

Accordingly, exemplary embodiments of the present invention propose a technique for, after measuring activities of a CPU and a bus and gathering and arranging operation information of respective function blocks and operation information of an SoC, adaptively scaling frequencies of the CPU and bus on the basis of the gathered/arranged information.

The operation information of the bus may vary according to the kind of a bus protocol used. According to an exemplary embodiment of the present invention, a description is made based on a widely used AMBA 3.0 AXI bus protocol of ARM Ltd. Co. However, exemplary embodiments of the present invention are not limited to the AXI protocol, and can apply to other bus protocols, such as an Open Core Protocol (OCP). In addition, the operation information of the bus may vary according to a delivery scheme of the operation information of the respective function blocks and the operation information of the SoC, such as an I/F protocol. Exemplary embodiments of the present invention are described below based on a simple protocol of an easily realizable request and interrupt form. Further, an algorithm for CPU and bus frequency scaling and its realization way may be of several forms, but a master/slave form is described herein as an exemplary implementation.

For convenience of description, the present invention calls a 'clock frequency of CPU' is denoted as a 'CPU frequency', and a 'clock frequency of bus' is denoted as a 'bus frequency'.

FIG. 1 illustrates a construction of a digital system according to an exemplary embodiment of the present invention. For exemplary, the digital system may be a System on a Chip (SoC). In the following description, it is assumed that the digital system is a SoC.

Referring to FIG. 1, the digital system includes an AFS controller 110, a clock controller 120, a CPU 130, a bus 140, and a plurality of function blocks 150-1 to 150-5. The plurality of function blocks 150-1 to 150-5 may be distinguished into a master function block and slave function blocks.

The AFS controller 110 receives operation information of the CPU 130, the bus 140, the plurality of function blocks 150-1 to 150-5, an SoC, and the like. Based on the received operation information, the AFS controller 110 determines a CPU frequency and a bus frequency. The AFS controller 110 provides the determined CPU frequency and bus frequency to the clock controller 120.

The clock controller 120 generates a CPU frequency and a bus frequency by receiving a reference clock from an internal Phase Loop Lock (PLL) or an external PLL and dividing the received reference clock. The clock controller 120 generates the CPU frequency and the bus frequency according to the determination of the AFS controller 110.

The CPU 130, a processing device taking charge of a main operation of the SoC, operates using the CPU frequency provided from the clock controller 120. The bus 140, an electrical path delivering data of the CPU 130 and the function blocks 150-1 to 150-5, operates using the bus frequency provided from the clock controller 120.

The function blocks 150-1 to 150-5, blocks performing respective functions for an operation of the SoC, operate using a separate clock or a bus clock. For example, the function blocks 150-1 to 150-5 may include a modulator/demodulator (modem), a memory controller, a Digital Signal Processor (DSP), a Universal Serial Bus (USB) controller, a Peripheral Component Interconnect (PCI) interface, and the like. The operation using the bus clock may include processing data to be transmitted through the bus 140 and buffering data transmitted/received through the bus 140.

Figure 2:
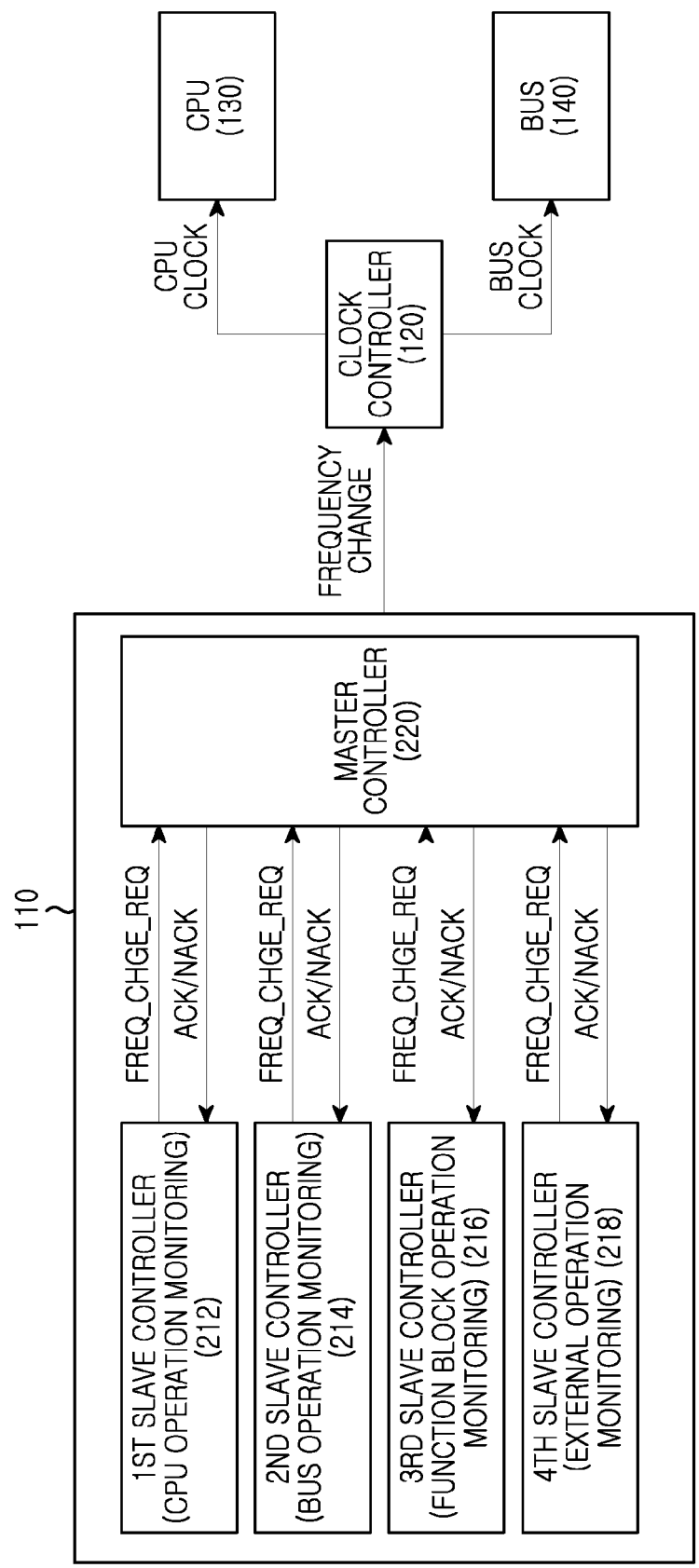
FIG. 2 is a block diagram illustrating an example of a construction of an Adaptive Frequency Scaling (AFS) controller of a digital system according to an exemplary embodiment of the present invention.

FIG. 2 illustrates an example of a construction of the AFS controller 110 of a digital system according to an exemplary embodiment of the present invention. FIG. 2 illustrates an example of a construction of the AFS controller 110 following a master/slave scheme. The master/slave scheme denotes a scheme in which a master receives a request for a change of a CPU frequency and a bus frequency from each of the slaves, and determines whether to change or reject a current CPU frequency and a current bus frequency.

Referring to FIG. 2, the AFS controller 110 may include a 1st slave controller 212, a 2nd slave controller 214, a 3rd slave controller 216, a 4th slave controller 218, and a master controller 220.

The 1st slave controller 212 monitors an operation of the CPU 130, selects a CPU frequency depending on an activity of the CPU 130, and then requests for the selected CPU frequency to the master controller 220. For example, the activity of the CPU 130 may be measured through an activity count value that reflects a length of a time duration during which the CPU 130 is in an idle state. The activity count value may increase with an increase of the time duration during which the CPU 130 is in the idle state or, inversely, the activity count value can increase with an increase of a time duration during which the CPU 130 is in a non-idle state, i.e., an active state. For example, when the CPU 130 turns On/Off an internal clock depending on its active/idle state, the 1st slave controller 212 may determine the activity count value by counting the On/Off internal clock. In this case, the 1st slave controller 212 compares the activity count value with a predefined threshold. If the activity count value is greater than the threshold, the 1st slave controller 212 determines to increase a CPU frequency in that the activity of the CPU 130 is large. If the activity count value is less than the threshold, the 1st slave controller 212 determines to decrease the CPU frequency in that the activity of the CPU 130 is less. When the number of selectable CPU frequency candidates is equal to '3' or more, a plurality of thresholds may be defined. A threshold for determining whether to increase the CPU frequency and a threshold for determining whether to decrease clock frequency may be defined separately.

The 2nd slave controller 214 monitors an operation of the bus 140, selects a bus frequency depending on an activity of the bus 140, and then requests the selected bus frequency from the master controller 220. For example, the 2nd slave controller 214 may request to decrease the bus frequency when there is no operation of the bus 140 during a predefined reference time. When a bus frequency is decreased, if there is an operation of the bus 140, the 2nd slave controller 214 may request to increase the bus frequency. The increase or decrease may be implemented by degrees using three or more candidate values or may be implemented at two levels using two candidate values. The 2nd slave controller 214 may determine the operation or non-operation of the bus 140 using a signal representing the operation or non-operation of the bus 140 dependent on a corresponding bus protocol. For example, when an AXI protocol is used, the operation or non-operation of the bus 140 may be determined by OR operating a 'VALID' signal and a 'READY' signal.

The 3rd slave controller 216 monitors operations of the function blocks 150-1 to 150-5, selects at least one of a bus frequency and a CPU frequency desired for the operations of the function blocks 150-1 to 150-5, and requests the selected CPU frequency or bus frequency from the master controller 220. To guarantee the performance of the respective function blocks 150-1 to 150-5, when a module using a clock of the bus 140 within the function blocks 150-1 to 150-5 initiates its operation, the 3rd slave controller 216 requests to increase the bus frequency as much as desired. In a case where a corresponding module needs an execution of Software (S/W), to guarantee a speed of the execution of the S/W, the 3rd slave controller 216 requests to increase the CPU frequency according to the desired amount. The 3rd slave controller 216 requests the master controller 220 for a maximum value of the bus frequencies and a maximum value of the CPU frequencies desired in the respective function blocks 150-1 to 150-5.

The 4th slave controller 218 monitors operations of external function blocks, determines a bus frequency for the operations of the external function blocks, and requests the determined bus frequency from the master controller 220. The 4th slave controller 218 has a similar structure as the 3rd slave controller 216, but receives desired clock frequencies from external APs of the SoC, not from the function blocks 150-1 to 150-5. For example, the desired clock frequency may be provided through a General Purpose Input/Output (GPIO) of the external AP.

Referring to the frequency change requests (Freq. Ch. Req.) from the respective slave controllers 212, 214, 216, and 218, the master controller 220 determines the CPU frequency and the bus frequency. The master controller 220 requests the clock controller 120 to change a current CPU frequency and a current bus frequency as determined. Although only a change of the bus frequency is requested, a change of both the CPU frequency and the bus frequency may be determined. Similarly, although a change of the CPU frequency is requested, the CPU frequency may change into a value different from the requested value in consideration of the current bus frequency. The master controller 220 notifies the slave controllers 212, 214, 216, and 218 of acceptance or non-acceptance of the requests of the slave controllers 212, 214, 216, and 218 and, at the time of a change of the CPU frequency or bus frequency, the master controller 220 notifies the slave controllers 212, 214, 216, and 218 of the changed CPU frequency or bus frequency.

Referring to the construction of FIG. 2, the following description is made for a case where there is a request for a change of the CPU frequency from the 1st slave controller 212.

The 1st slave controller 212 determines one up threshold and one down threshold to use in a current CPU frequency among a plurality of up thresholds and a plurality of down thresholds, using operation information of the CPU 130. The 1st slave controller 212 compares an activity count value, which is counted during a reference time of one period, with the up threshold/down threshold. If the activity count value is greater than the up threshold, the 1st slave controller 212 determines an increase of the CPU frequency. If the activity count value is less than the down threshold, the 1st slave controller 212 determines a decrease of the CPU frequency.

The 1st slave controller 212 selects a concrete requested CPU frequency of an increase or decrease according to a current configuration. The configuration, which may vary according to an exemplary implementation and an intention of an operator, defines changeable CPU frequency candidates or range. The 1st slave controller 212 sends a request for a change to the selected CPU frequency to the master controller 220. For example, the 1st slave controller 212 may transmit a signal requesting for the change of the CPU frequency and a signal representing the requested CPU frequency, to the master controller 220.

When a request for a decrease of a CPU frequency has been made, the master controller 220 determines whether the requested CPU frequency is less than a current bus frequency. If the requested CPU frequency is greater than or equal to the current bus frequency, the master controller 220 determines to change the CPU frequency to the requested value. When the requested CPU frequency is less than the current bus frequency, the master controller 220 determines to change the CPU frequency to a minimum value in a possible range, i.e., into a minimum value of CPU frequency candidates greater than or equal to the current bus frequency.

The master controller 220 determines if a collision occurs between a bus frequency change request from at least one of the other slave controllers 214, 216, and 218 and a CPU frequency change request of the 1st slave controller 212. The collision or non-collision is determined by the relationship between a CPU frequency and a bus frequency, i.e., the relationship that the bus frequency cannot be greater than the CPU frequency. For example, if a requested bus frequency is greater than or is equal to a current CPU frequency, the current CPU frequency cannot be decreased. If the collision occurs, the master controller 220 notifies the 1st slave controller 212 that the request is rejected. If the collision does not occur, the master controller 220 requests the clock controller 120 to change the current CPU frequency into a determined value. According to the request of the master controller 220, the clock controller 120 changes the current CPU frequency, and notifies the master controller 220 of the change of the current CPU frequency. After that, the master controller 220 updates a current CPU frequency state, and notifies the slave controllers 212, 214, 216, and 218 of a changed CPU frequency value. The slave controllers 212, 214, 216, and 218 each also update current clock frequency states accordingly.

Referring to the construction of FIG. 2, the following description is made for a case where there is a request for a change of the bus frequency from the 2nd slave controller 214.

The 2nd slave controller 214 determines if the bus 140 operates during a predefined reference time. For example, when an AXI protocol is applied, the 2nd slave controller 214 determines if the bus 140 is in an idle state through a value ORing a 'VALID' signal and a 'READY' signal, thereby being capable of identifying the operation or non-operation of the bus 140. If there is no operation of the bus 140 during the reference time, the 2nd slave controller 214 determines to decrease the bus frequency. The 2nd slave controller 214 selects a concrete requested bus frequency of a decrease according to a current configuration. The requested bus frequency of the decrease may be selected by degrees or as a minimum value according to a configuration of the 2nd slave controller 214. The 2nd slave controller 214 sends a request to the master controller 220 for a change to the selected requested bus frequency. For example, the 2nd slave controller 214 may transmit signals to the master controller 220 requesting for the change of the bus frequency and representing the requested bus frequency.

The master controller 220 determines if a collision occurs between a CPU frequency or bus frequency change request from at least one of the other slave controllers 216 and 218 and a bus frequency change request of the 2nd slave controller 214. For example, if a bus frequency requested by at least one of the other slave controllers 216 and 218 is greater than a bus frequency requested by the 2nd slave controller 214, the bus frequency change request of the 2nd slave controller 214 is not acceptable. If the collision occurs, the master controller 220 notifies the 2nd slave controller 214 that the request is rejected. If the collision does not occur, the master controller 220 requests the clock controller 120 to decrease the bus frequency. According to the request of the master controller 220, the clock controller 120 changes the bus frequency, and notifies the master controller 220 of the change of the bus frequency. The master controller 220 updates a current clock frequency state, and notifies the slave controllers 212, 214, 216, and 218 of a changed bus frequency value. The slave controllers 212, 214, 216, and 218 each also update current clock frequency states accordingly.

When the bus frequency is not a maximum value, if the bus 140 operates, the 2nd slave controller 214 determines to increase the bus frequency. The 2nd slave controller 214 selects a concrete requested bus frequency increase according to a current configuration. According to a configuration of the 2nd slave controller 214, the requested bus frequency increase may be selected by degrees or as a minimum value. The 2nd slave controller 214 sends a request for a change into the selected requested bus frequency to the master controller 220. For example, the 2nd slave controller 214 may transmit a signal requesting for the change of the bus frequency and a signal representing the requested bus frequency, to the master controller 220.

When the requested bus frequency is less than or equal to a current CPU frequency, the master controller 220 requests the clock controller 120 to increase the bus frequency. If the requested bus frequency is greater than the current CPU frequency, the master controller 220 requests the clock controller 120 to increase both the bus frequency and the current CPU frequency. A value of the increased CPU frequency is greater than or is equal to a value of the increased bus frequency. The master controller 220 is notified that at least one of the CPU frequency and the bus frequency is changed from the clock controller 120, updates a current clock frequency state, and notifies the slave controllers 212, 214, 216, and 218 of at least one value of the changed CPU frequency and bus frequency. The slave controllers 212, 214, 216, and 218 each also update current clock frequency states accordingly.

Referring to the construction of FIG. 2, the following description is made for a case where there is a request for a change of the bus frequency or the CPU frequency from the 3rd slave controller 216.

The 3rd slave controller 216 receives CPU frequency or bus frequency change requests from the respective function blocks 150-1 to 150-5 and compares the change requests, thereby determining a maximum value of requested CPU frequencies and a maximum value of requested bus frequencies. The 3rd slave controller 216 compares the maximum values with a current CPU frequency and a current bus frequency. If the maximum value of the requested CPU frequencies is greater than the current CPU frequency, the 3rd slave controller 216 requests the master controller 220 to increase the current CPU frequency to the maximum value of the requested CPU frequencies. If the maximum value of the requested bus frequencies is greater than the current bus frequency, the 3rd slave controller 216 requests the master controller 220 to increase the current bus frequency to the maximum value of the requested bus frequencies. According to another exemplary embodiment of the present invention, when demandable CPU frequency and bus frequency candidates have been defined according to a configuration of the 3rd slave controller 216, the 3rd slave controller 216 requests the master controller 220 to increase a CPU frequency or a bus frequency to a candidate value greater than or equal to the maximum value and closest to the maximum value.

When only an increase of the CPU frequency has been requested, the master controller 220 requests the clock controller 120 to increase the CPU frequency.

When only an increase of the bus frequency has been requested, the master controller 220 compares a current clock frequency of the CPU 130 and a requested clock frequency of the bus 140. If the requested clock frequency of the bus 140 is less than or equal to the current clock frequency of the CPU 130, the master controller 220 requests the clock controller 120 to increase the bus frequency. If the requested clock frequency of the bus 140 is greater than the current clock frequency of the CPU 130, the master controller 220 requests the clock controller 120 to increase the clock frequencies of all the bus 140 and the CPU 130.

When an increase of both the CPU frequency and the bus frequency has been requested, the master controller 220 compares the requested CPU frequency and the requested bus frequency. If the requested bus frequency is less than or equal to the requested CPU frequency, the master controller 220 requests the clock controller 120 to increase the CPU frequency and the bus frequency as requested by the 3rd slave controller 216. If the requested bus frequency is greater than the requested CPU frequency, the master controller 220 requests the clock controller 120 to increase the bus frequency to a requested bus frequency value, and the CPU frequency to a value greater than or equal to the requested bus frequency value.

The master controller 220 is notified that at least one of a CPU frequency and a bus frequency is changed from the clock controller 120, and updates a current clock frequency state. The master controller 220 notifies the slave controllers 212, 214, 216, and 218 of a value of at least one of the changed CPU frequency and the changed bus frequency. The slave controllers 212, 214, 216, and 218 each also update current clock frequency states accordingly.

A CPU frequency or bus frequency needed by the function blocks 150-1 to 150-5 should be maintained until operations of the function blocks 150-1 to 150-5 are ended. Accordingly, the 3rd slave controller 216 requests the master controller 220 to maintain the needed CPU frequency or bus frequency until the operations of the function blocks 150-1 to 150-5 are ended. If a request for a change of a CPU frequency or bus frequency into a value less than the CPU frequency or bus frequency needed by the function blocks 150-1 to 150-5 is made from at least one of the other slave controllers 212, 214, and 218 during the operations of the function blocks 150-1 to 150-5, the master controller 220 disregards the request from at least one of the other slave controllers 212, 214, and 218.

Figure 3:
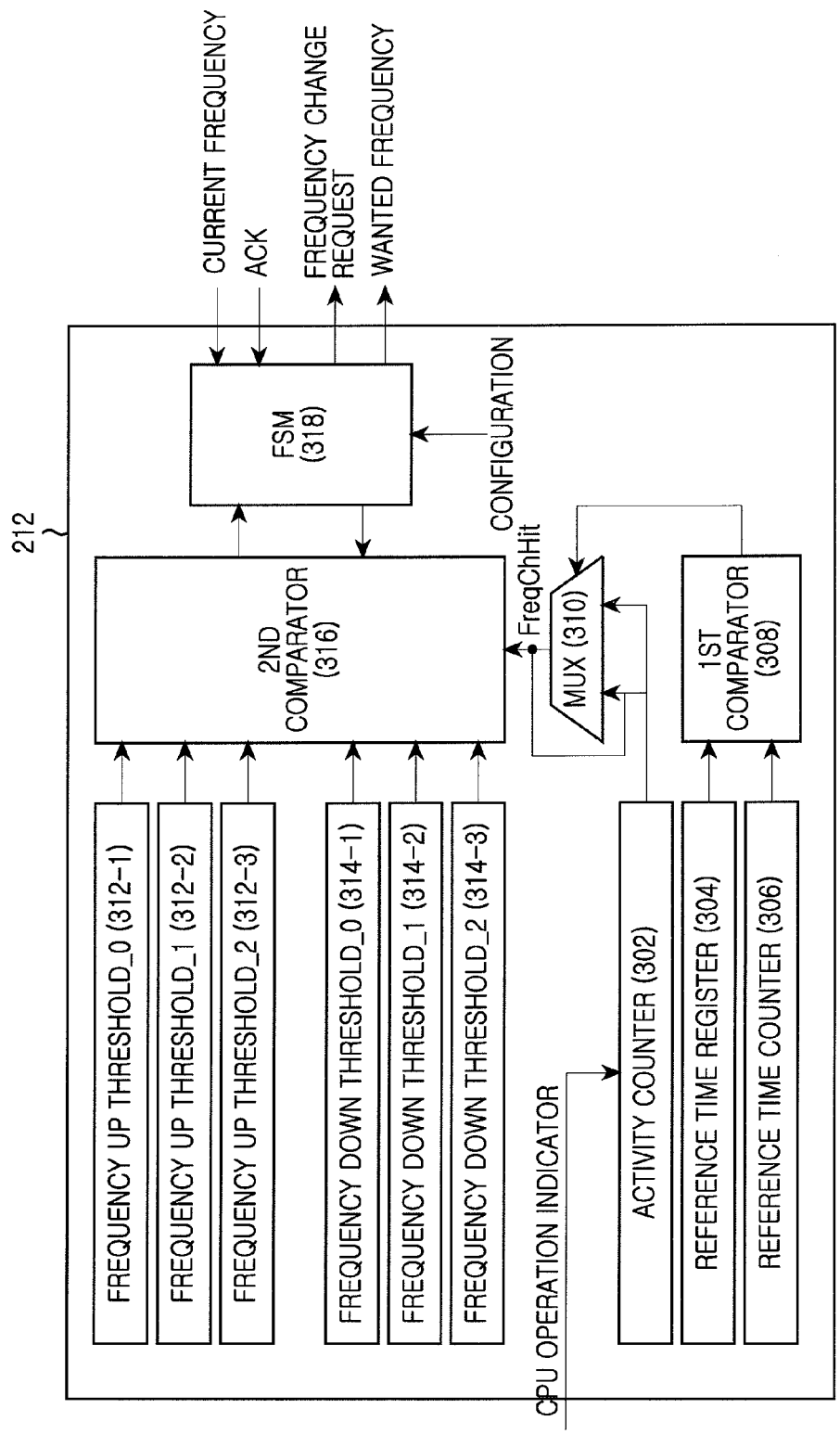
FIG. 3 is a block diagram illustrating an example of a construction of a slave controller for Central Processing Unit (CPU) monitoring of a digital system according to an exemplary embodiment of the present invention.

FIG. 3 illustrates an example of a construction of the slave controller 212 for monitoring the CPU 130 in a digital system according to an exemplary embodiment of the present invention.

Referring to FIG. 3, the 1st slave controller 212 includes an activity counter 302 for measuring an activity of the CPU 130, a Reference time register (Ref time register) 304 defining a comparison period of an activity count value and a threshold, a Reference time counter (Ref time counter) 306 initialized every comparison period, a 1st comparator 308 for determining the lapse or non-lapse of the comparison period, a Multiplexer (MUX) 310 for outputting an activity count value every comparison period, a plurality of registers 312-1 to 312-3 for storing respective up thresholds, a plurality of registers 314-1 to 314-3 for storing respective down thresholds, a 2nd comparator 316 for comparing a threshold and a counter value, and a Frequency Scaling Module (FSM) 318 for requesting a change of the CPU frequency according to the comparison result of the 2nd comparator 316.

FIG. 3 illustrates an exemplary embodiment of a case where a CPU frequency change is implemented at four levels. Accordingly, three up thresholds and three down thresholds are defined. The reference time counter 306 counts a clock up to a reference time value stored in the reference time register 304. When a clock count value is equal to the reference time value, an output value of the 1st comparator 308 varies and, due to this, an output of the MUX 310 varies. The MUX 310 outputs a feedback value of its own output while the clock count value is different from the reference time value, and outputs an activity count value provided from the activity counter 302 when the clock count value is equal to the reference time value. Accordingly, the 2nd comparator 316 receives a new activity count value when the clock count value is equal to and the reference time value. The new activity count value may be the number of internal clocks of the CPU 130 counted during a reference time of one period. The 2nd comparator 316 compares the new activity count value with an up threshold/down threshold corresponding to a current CPU frequency and provides the comparison result to the FSM 318. Based on the comparison result, the FSM 318 determines whether to increase, decrease, or maintain the current CPU frequency. If a change of a CPU frequency is desired, the FSM 318 provides a desired CPU frequency and frequency change request to the master controller 220. The FSM 318 maintains current clock frequency state information representing a current CPU frequency and a current bus frequency.

Signals input/output to/from the FSM 318 are given as follows. A 'current clock frequency (CurrentFreq)' is a signal representing a current clock frequency, an 'Ack' is a signal representing whether a desired clock frequency change was accepted, a 'clock frequency change request (FreqChangRequest)' represents a signal including a request for a clock frequency change, a 'desired clock frequency (WantedFreq)' is a signal representing a desired clock frequency value, and a 'Configuration' is a signal defining changeable CPU frequency candidates or defining a range.

Figure 4:
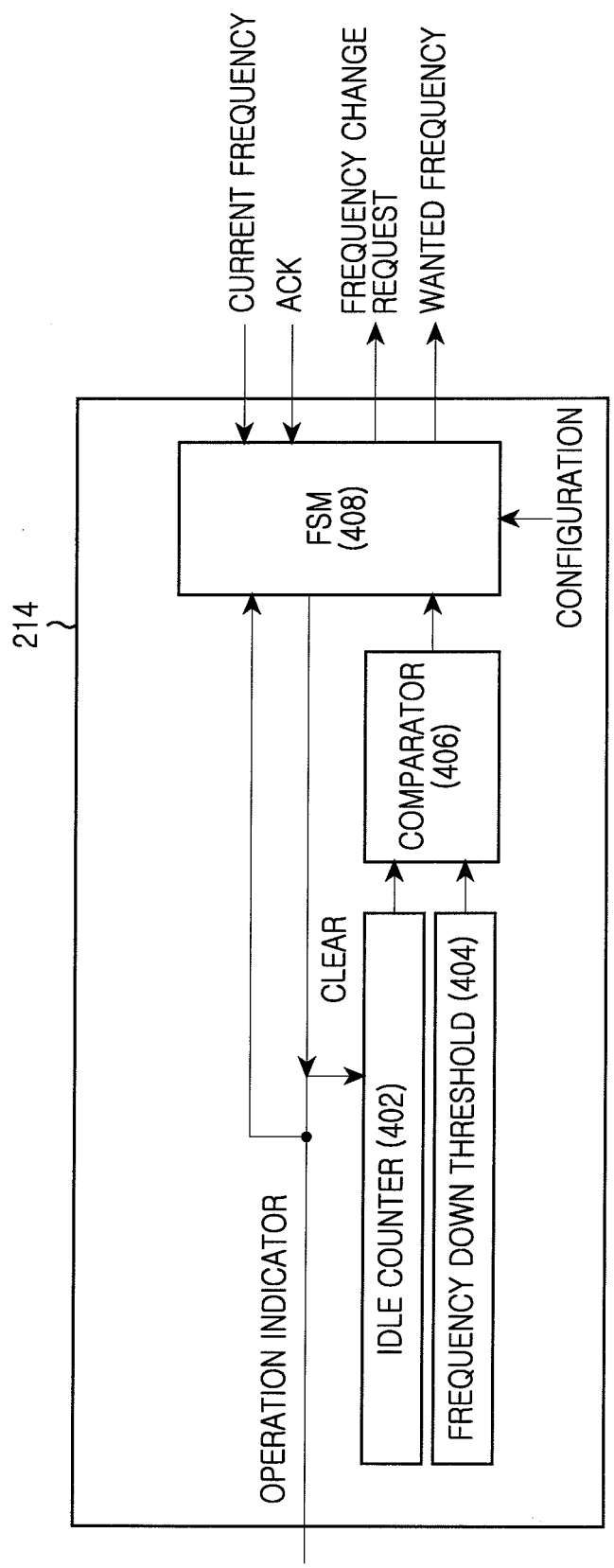
FIG. 4 is a block diagram illustrating an example of a construction of a slave controller for bus monitoring of a digital system according to an exemplary embodiment of the present invention.

FIG. 4 illustrates an example of a construction of a slave controller 214 for bus monitoring of a digital system according to an exemplary embodiment of the present invention.

Referring to FIG. 4, the 2nd slave controller 214 includes an idle counter 402 for counting the number of clocks during a time duration for which there is no operation of the bus 140, a register 404 defining a reference time for decreasing the bus frequency, a comparator 406 for comparing an idle count value that is an output of the idle counter 402 with the reference time value, and an FSM 408 for requesting the bus frequency change according to the comparison result of the comparator 406.

The idle count value of the idle counter 402 increases while there is no operation of the bus 140, and the idle count value inputting a signal representing that there is an operation of the bus 140 is initialized. The comparator 406 compares the idle count value with the reference time value stored in the register 404, and provides the comparison result to the FSM 408. If the idle count value is greater than the reference time value, the FSM 408 determines that there was no operation of the bus 140 during the reference time, and requests the master controller 220 to decrease the bus frequency. When the bus frequency is decreased, if the reference time value is greater than the idle count value, the FSM 408 determines that the operation of the bus 140 was generated, and requests the master controller 220 to increase the bus frequency. The FSM 408 maintains current clock frequency state information representing a current CPU frequency and a current bus frequency.

Signals input/output to/from the FSM 408 are given as follows. A 'current clock frequency (CurrentFreq)' is a signal representing a current clock frequency, an 'Ack' is a signal representing whether a desired clock frequency change was accepted, a 'clock frequency change request (FreqChangRequest)' represents a signal including a request for a clock frequency change, a 'desired clock frequency (WantedFreq)' is a signal representing a desired clock frequency value, and a 'Configuration' is a signal defining changeable CPU frequency candidates or defining a range.

Figure 5:
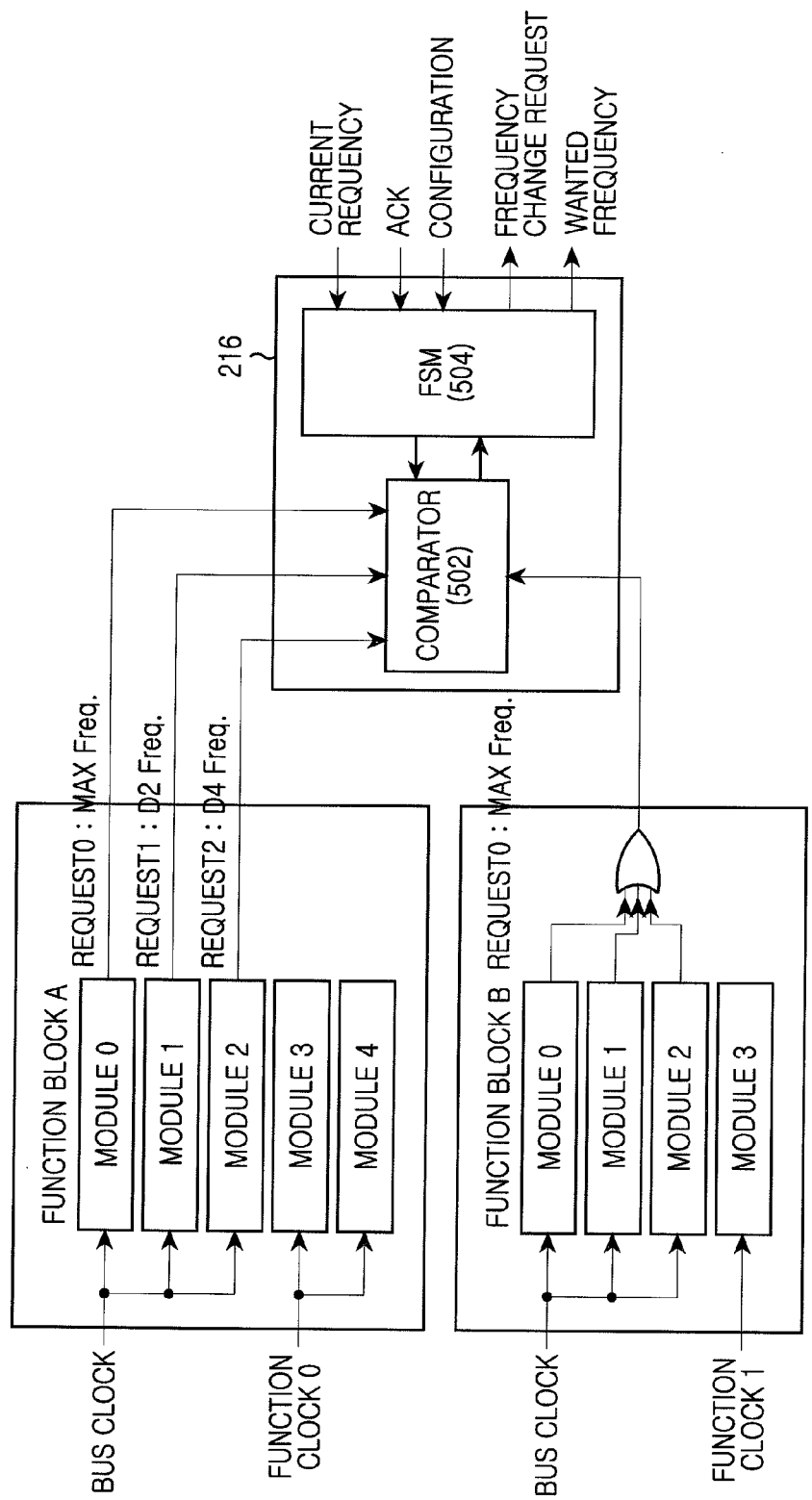
FIG. 5 is a block diagram illustrating an example of a construction of a slave controller for function block monitoring of a digital system according to an exemplary embodiment of the present invention.

FIG. 5 illustrates an example of a construction of a slave controller for monitoring the function blocks 150-1 to 150-5 of a digital system according to an exemplary embodiment of the present invention.

Referring to FIG. 5, the 3rd slave controller 216 includes a comparator 502 for comparing CPU frequencies or bus frequencies desired in the respective function blocks 150-1 to 150-5, and an FSM 504 for requesting a change of the CPU frequency or bus frequency according to the comparison result of the comparator 502.

The comparator 502 compares clock frequency change requests from the function blocks 150-1 to 150-5, and provides a maximum value to the FSM 504. The FSM 504 receiving the maximum value of the requested CPU frequencies or requested bus frequencies determines whether the maximum value is greater than a current CPU frequency or a current bus frequency. If so, the FSM 504 requests the master controller 220 to increase the current CPU frequency or the current bus frequency into a corresponding maximum value.

The FSM 504 maintains current clock frequency state information representing the current CPU frequency and the current bus frequency.

Signals input/output to/from the FSM 504 are given as follows. A 'current clock frequency (CurrentFreq)' is a signal representing a current clock frequency, an 'Ack' is a signal representing whether a desired clock frequency change was accepted, a 'Configuration' is a signal defining changeable CPU frequency candidates or defining a range, a 'clock frequency change request (FreqChangRequest)' represents a signal including a request for a clock frequency change, and a 'desired clock frequency (WantedFreq)' is a signal representing a desired clock frequency value.

The clock frequency change request from each of the function blocks 150-1 to 150-5 can be plural per function block as in a function block A, or be one per function block as in a function block B. For example, according to an exemplary embodiment of the present invention, when it is intended to adjust a clock frequency precisely by module using a clock of the bus 140 within one function block, a desired clock frequency is provided by module using the clock of the bus 140 as in the function block A. According to another exemplary embodiment of the present invention, if even one module using the clock of the bus 140 within one function block operates, a maximum desired clock frequency of a corresponding function block is provided as in the function block B.

FIG. 5 illustrates that a clock frequency change request of a function block is directly provided in each module. However, according to another exemplary embodiment of the present invention, a separate block providing the clock frequency change request can be included. In this case, the separate block observes operation states of the modules and, when the modules operate, the separate block may provide a corresponding clock frequency change request to the comparator 502.

Figure 6:
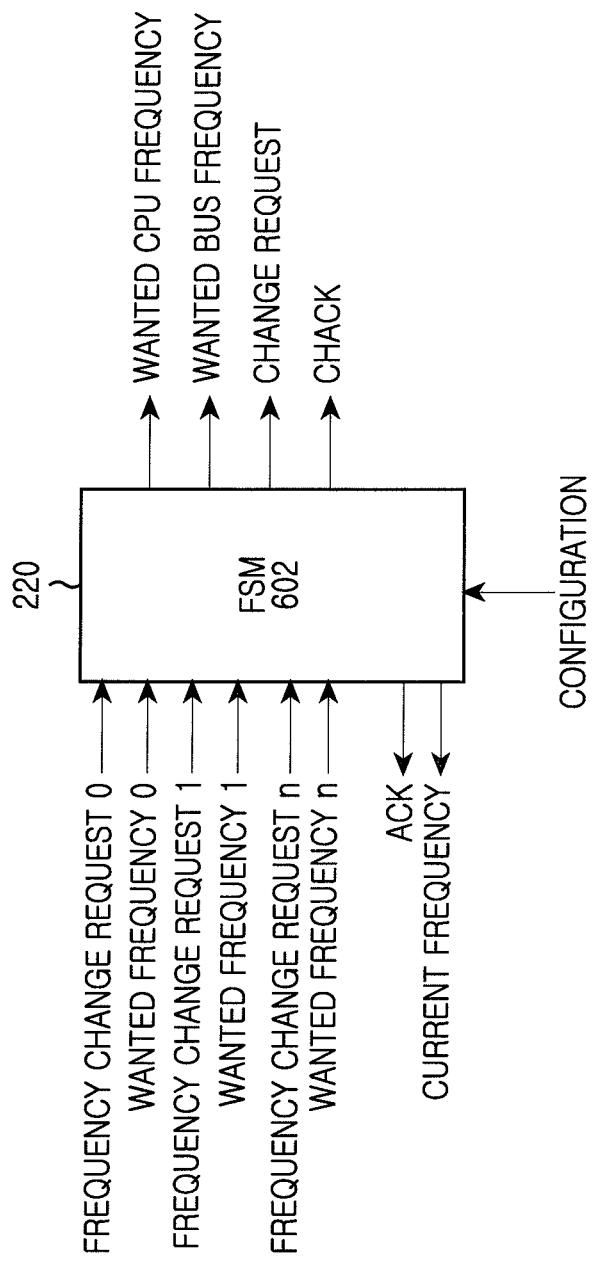
FIG. 6 is a block diagram illustrating an example of a construction of a master controller of a digital system according to an exemplary embodiment of the present invention.

FIG. 6 illustrates an example of a construction of the master controller 220 of a digital system according to an exemplary embodiment of the present invention.

Referring to FIG. 6, the master controller 220 includes an FSM 602 for determining the CPU frequency and the bus frequency according to clock frequency change requests from the slave controllers 212, 214, 216, and 218.

The FSM 602 determines a CPU frequency and a bus frequency with reference to the clock frequency change requests of the slave controllers 212, 214, 216, and 218, and requests the clock controller 120 for the determined CPU frequency and bus frequency. The FSM 602 may determine collision or non-collision between the clock frequency change requests of the slave controllers 212, 214, 216, and 218 and, according to the collision or non-collision, disregard the request. The FSM 602 maintains current clock frequency state information representing a current CPU frequency and a current bus frequency.

Signals input/output to/from the FSM 602 are given as follows. A 'clock frequency change request (FreqChangRequest)' represents a signal including a request for a clock frequency change, a 'desired clock frequency (WantedFreq)' is a signal representing a desired clock frequency value, an 'Ack' is a signal representing whether a desired clock frequency change was accepted, a 'current clock frequency (CurrentFreq)' is a signal representing a current clock frequency, a 'desired CPU clock frequency (WantedCpuFreq)' is a signal representing the CPU frequency desired to the clock controller 120, a 'desired bus clock frequency (WantedBusFreq)' is a signal representing the bus frequency desired to the clock controller 120, a 'channel request (ChRequest)' is a signal representing requesting the clock controller 120 for a clock frequency change, a 'change acknowledgement (ChAck)' is a signal representing whether to change a clock frequency provided from the clock controller 120, and a 'Configuration' is a signal defining changeable CPU frequency candidates or defining a range.

Figure 7:
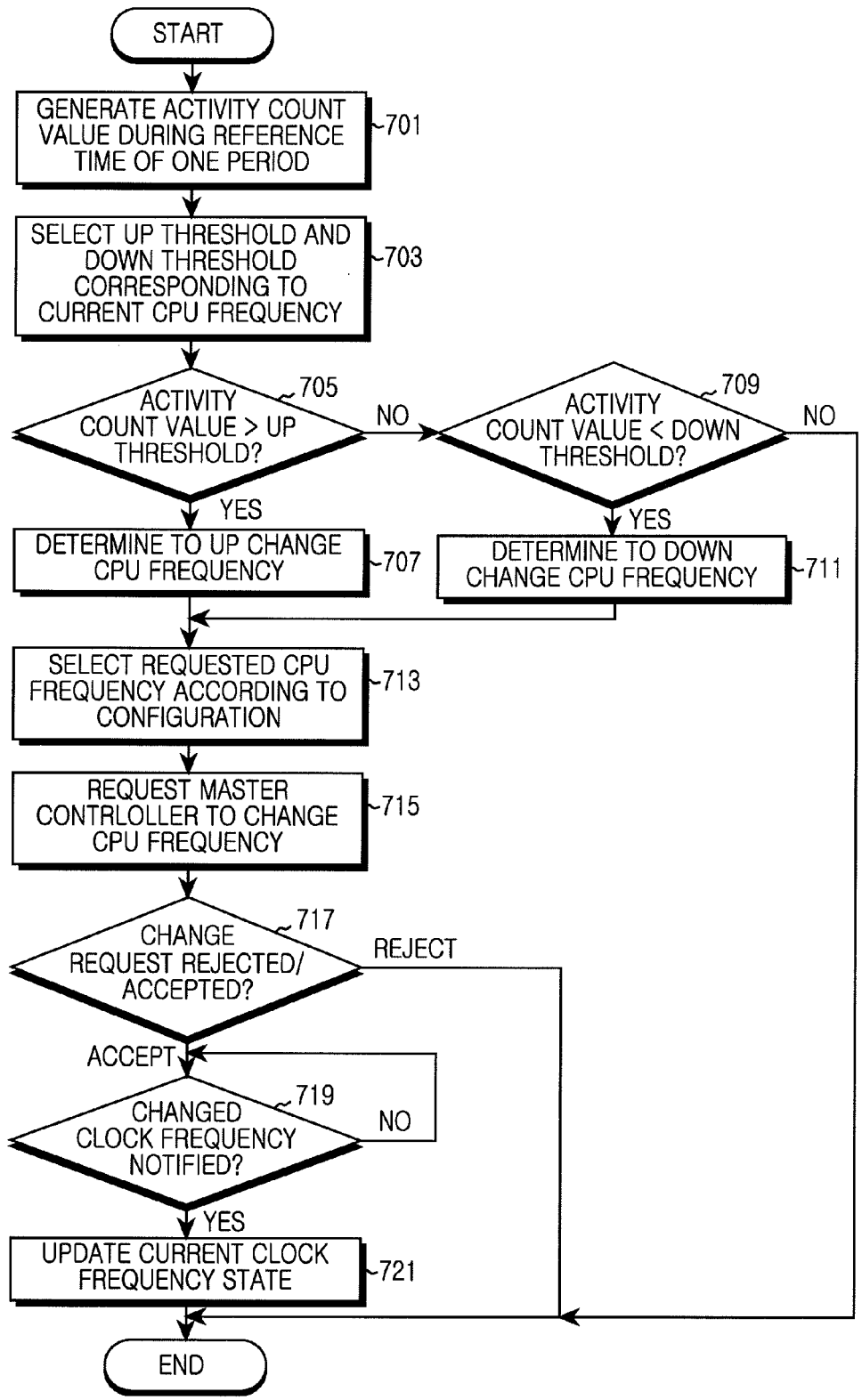
FIG. 7 is a flowchart illustrating an operation procedure of a slave controller for CPU monitoring of a digital system according to an exemplary embodiment of the present invention.

FIG. 7 illustrates an operation procedure of a 1st slave controller for CPU monitoring of a digital system according to an exemplary embodiment of the present invention.

Referring to FIG. 7, in step 701, the 1st slave controller 212 generates an activity count value during a reference time of one period. The activity count value may increase with an increase of a time duration in which the CPU 130 is in an idle state or, inversely, the activity count value may increase with an increase of a time duration in which the CPU 130 is in a non-idle state, i.e., in an active state. For example, when the CPU 130 turns On/Off an internal clock depending on its active/idle state, the 1st slave controller 212 may determine the activity count value by counting the On/Off internal clock.

After generating the activity count value, the 1st slave controller 212 selects an up threshold and down threshold corresponding to a current CPU frequency in step 703. When the number of selectable CPU frequency candidates is equal to three or more, a plurality of thresholds may be defined. In this case, the 1st slave controller 212 selects a pair of up/down thresholds among the plurality of up/down thresholds. The up threshold and down threshold may be the same values or different values.

The 1st slave controller 212 determines whether the activity count value is greater than the up threshold in step 705. If the activity count value is greater than the up threshold, the 1st slave controller 212 and determines to increase the CPU frequency in step 707. If the activity count value is greater than the up threshold, an activity of the CPU 130 is high presently, so the 1st slave controller 212 determines to increase the CPU frequency.

If the activity count value is less than or is equal to the up threshold in step 705, the 1st slave controller 212 determines whether the activity count value is less than the down threshold in step 709. If the activity count value is less than the down threshold, the 1st slave controller 212 determines to decrease the CPU frequency in step 711. If the activity count value is less than the down threshold, an activity of the CPU 130 is less presently, so the 1st slave controller 212 determines to decrease the CPU frequency.

After determining to increase the CPU frequency in step 707 or determining to decrease the CPU frequency in step 711, the 1st slave controller 212 selects a concrete requested CPU frequency value in step 713 according to a configuration. The configuration may vary according to an exemplary implementation or an intention of an operator, and defines changeable CPU frequency candidates or range. For example, the configuration may define CPU frequency candidates as a maximum frequency, ½ of the maximum frequency, ¼ of the maximum frequency, ⅛ of the maximum frequency, and the like.

The 1st slave controller 212 requests the master controller 220 to change the CPU frequency in step 715. The 1st slave controller 212 provides the requested CPU frequency value together. For example, the 1st slave controller 212 transmits signals to the master controller 220 requesting for the change of the CPU frequency and representing the requested CPU frequency.

The 1st slave controller 212 determines whether the CPU frequency change request is rejected or accepted in step 717. The rejection/acceptance of the change request is identified through an Ack/Nack (Acknowledgement/Non-acknowledgement) signal received from the master controller 212. If the change request is accepted, the 1st slave controller 212 determines whether a changed clock frequency is notified in step 717. The changed clock frequency includes at least one of a CPU frequency and a bus frequency. If the changed clock frequency is notified, the 1st slave controller 212 updates current clock frequency state information as notified in step 721.

Figure 8:
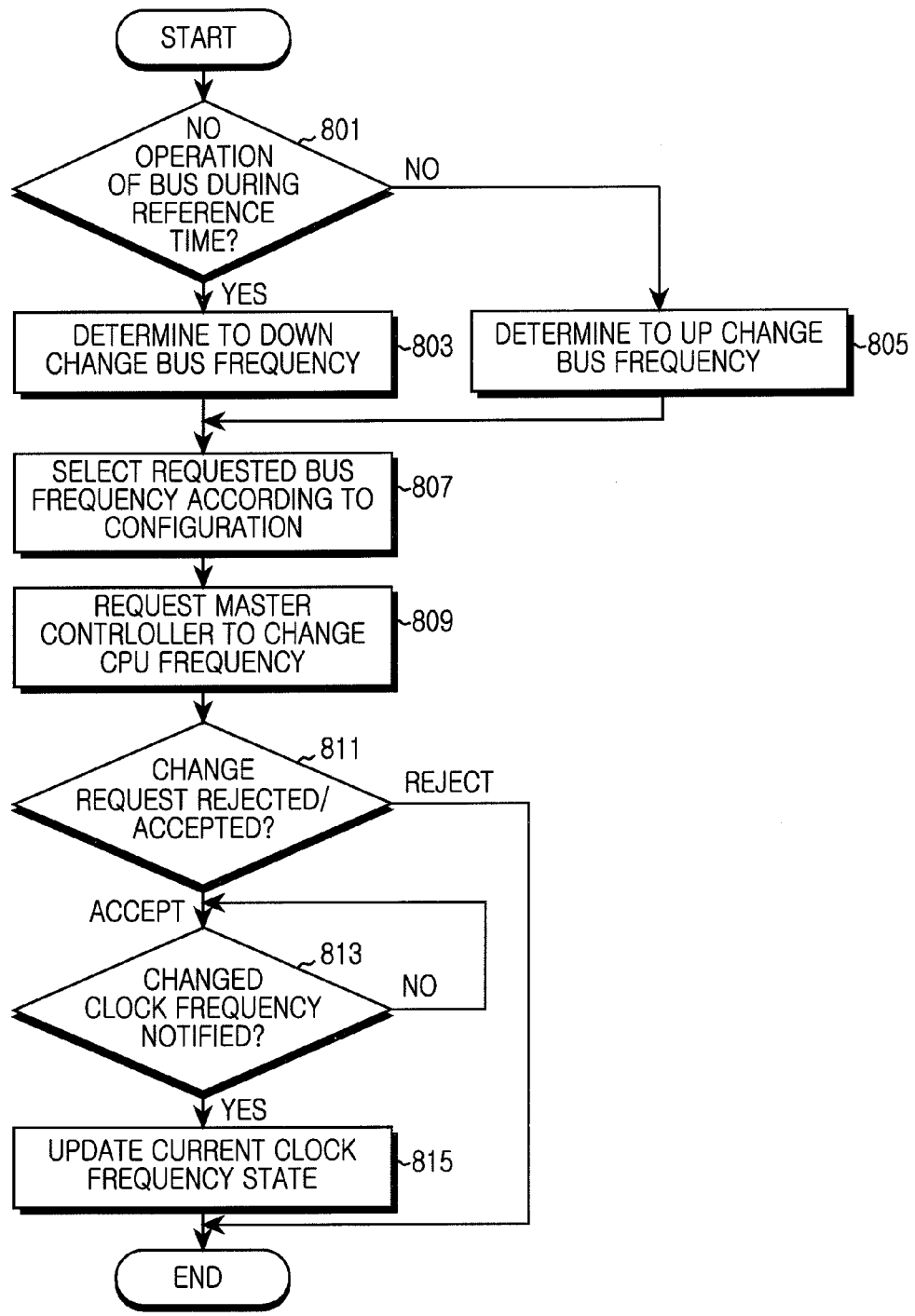
FIG. 8 is a flowchart illustrating an operation procedure of a slave controller for bus monitoring of a digital system according to an exemplary embodiment of the present invention.

FIG. 8 illustrates an operation procedure of a 2nd slave controller for bus monitoring of a digital system according to an exemplary embodiment of the present invention.

Referring to FIG. 8, in step 801, the 2nd slave controller 214 determines whether the bus 140 has not operated during a predefined reference time. The operation or non-operation of the bus 140 may be determined by observing a signal generated at the time of operation of the bus 140. For example, when an AXI protocol is applied, the 2nd slave controller 214 may determine the operation or non-operation of the bus 140 by determining whether the bus 140 is in an idle or non-idle state through a value ORing a 'VALID' signal and a 'READY' signal.

If it is determined in step 801 that the bus 140 has not operated during the reference time, the 2nd slave controller 214 determines to decrease the bus frequency in step 803. If it is determined in step 801 an operation of the bus 140 has occurred before the lapse of the reference time, the 2nd slave controller 214 determines to increase the bus frequency in step 805. However, the increase is determined only when a current bus frequency is decreased due to the non-operation of the bus 140 during the reference time. Accordingly, if the bus frequency has not been decreased due to the non-operation of the bus 140 during the reference time, step 805 is omitted. According to another exemplary embodiment of the present invention, the increase can be determined only when a current bus frequency is not a maximum. In this case, in a case where the current bus frequency is the maximum, step 805 is omitted.

After determining to decrease the bus frequency in step 803 or determining to increase the bus frequency in step 805, the 2nd slave controller 214 selects a concrete requested bus frequency value in step 807 according to a configuration. The configuration may vary according to an exemplary implementation or an intention of an operator, and defines changeable bus frequency candidates or range. Accordingly, according to the concrete configuration of the 2nd slave controller 214, the requested bus frequency increase/decrease may be selected by degrees or as a minimum value/maximum value.

The 2nd slave controller 214 requests the master controller 220 to change the bus frequency in step 809. The 2nd slave controller 214 provides the requested bus frequency value together. For example, the 2nd slave controller 214 may transmit signals to the master controller 220 requesting for the change of the bus frequency and representing the requested bus frequency.

The 2nd slave controller 214 determines whether the bus frequency change request is rejected or accepted. The rejection/acceptance of the change request is identified through an Ack/Nack signal received from the master controller 212. If the change request is accepted in step 811, the 2nd slave controller 214 determines whether a changed clock frequency is notified in step 813. The changed clock frequency includes at least one of a CPU frequency and a bus frequency. If the changed clock frequency is notified in step 813, the 2nd slave controller 214 updates current clock frequency state information in step 815 as notified.

Figure 9:
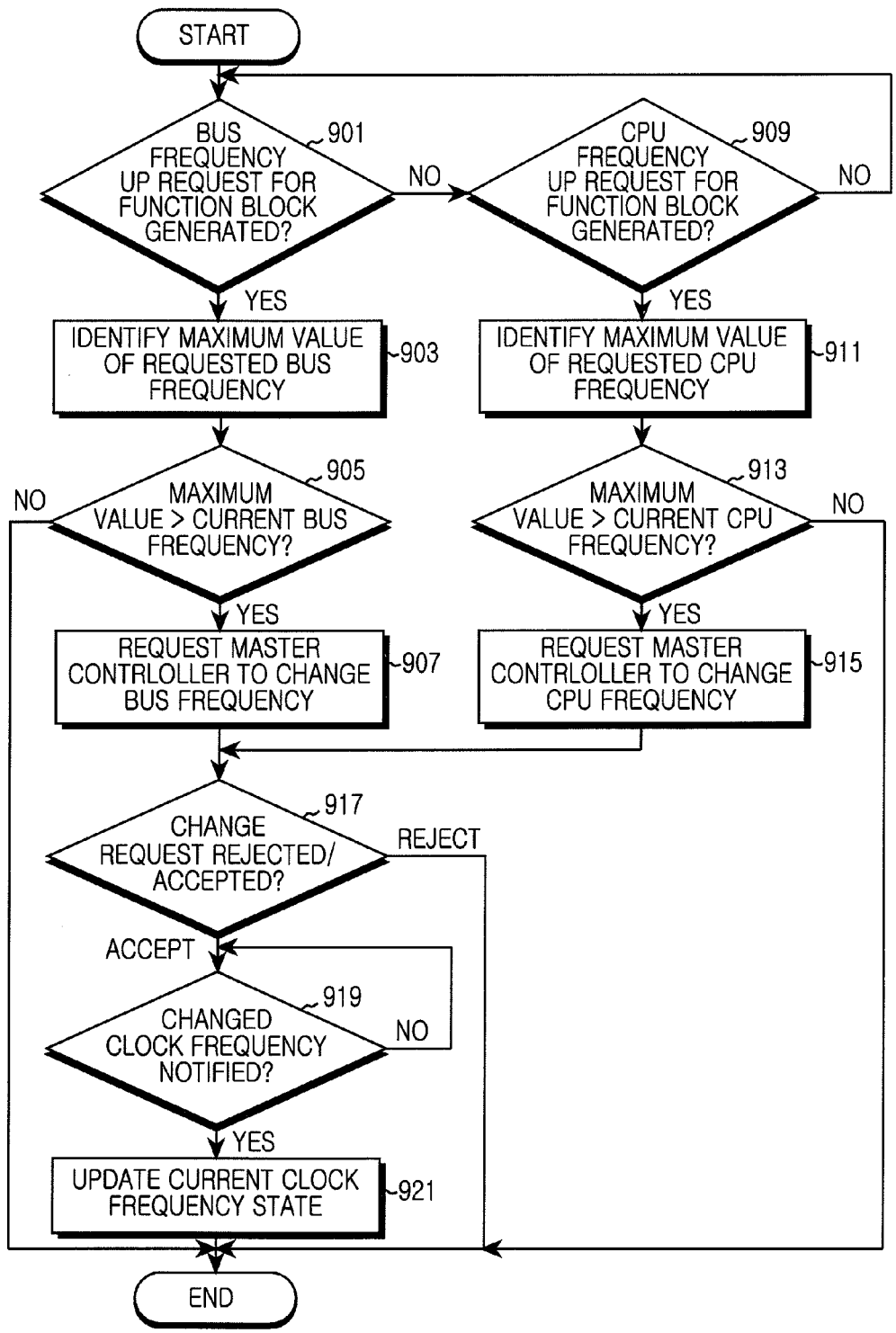
FIG. 9 is a flowchart illustrating an operation procedure of a slave controller for function block monitoring of a digital system according to an exemplary embodiment of the present invention.

FIG. 9 illustrates an operation procedure of a 3rd slave controller for function block monitoring of a digital system according to an exemplary embodiment of the present invention.

Referring to FIG. 9, in step 901, the 3rd slave controller 216 determines whether a bus frequency up request for a function block is generated. The bus frequency up request is generated when a module using a clock of the bus 140 within the function block initiates its operation.

If it is determined in step 901 that the bus frequency up request for the function block is generated, the 3rd slave controller 216 identifies a maximum value of a requested bus frequency in step 903. When bus frequency up requests for a plurality of function blocks are generated, the 3rd slave controller 216 identifies a maximum value of requested bus frequencies of each request. If only one request is generated, the maximum value is a requested bus frequency of the one request.

The 3rd slave controller 216 determines whether the maximum value is greater than a current bus frequency. If it is determined in step 905 that the maximum value is less than or equal to the current bus frequency, there is no need to request for an increase of the bus frequency, so the 3rd slave controller 216 terminates the procedure of FIG. 9.

If it is determined in step 905 that the maximum value is greater than the current bus frequency, the 3rd slave controller 216 requests the master controller 220 to increase the bus frequency to the maximum value in step 907. The 3rd slave controller 216 provides the requested bus frequency value together. For example, the 3rd slave controller 216 may transmit signals to the master controller 220 requesting for a change of the bus frequency and representing the requested bus frequency.

If the bus frequency up request for the function block is not generated in step 901, the 3rd slave controller 216 determines whether a CPU frequency up request for a function block is generated. The CPU frequency up request is generated when a module within the function block intends to execute S/W.

If the CPU frequency up request for the function block is generated in step 909, the 3rd slave controller 216 determines a maximum value of a requested CPU frequency in step 911. When CPU frequency up requests for a plurality of function blocks are generated, the 3rd slave controller 216 determines a maximum value of requested CPU frequencies of each request. If only one request is generated, the maximum value is a requested CPU frequency of the one request.

The 3rd slave controller 216 determines whether the maximum value is greater than a current CPU frequency. If it is determined in step 913 that the maximum value is less than or equal to the current CPU frequency, there is no need to request for an increase of the CPU frequency, so the 3rd slave controller 216 terminates the procedure of FIG. 9.

If it is determined in step 913 that the maximum value is greater than the current CPU frequency, the 3rd slave controller 216 requests the master controller 220 to increase the CPU frequency to the maximum value in step 915. The 3rd slave controller 216 provides the requested CPU frequency value together. For example, the 3rd slave controller 216 may transmits signals to the master controller 220 requesting for the change of the CPU frequency and representing the requested CPU frequency.

The 3rd slave controller 216 determines whether the bus frequency or CPU frequency change request is rejected or accepted. The rejection/acceptance of the change request is determined through an Ack/Nack signal received from the master controller 212. If the change request is accepted, the 3rd slave controller 216 determines in step 919 whether a changed clock frequency is notified. The changed clock frequency includes at least one of a CPU frequency and a bus frequency. If the changed clock frequency is notified, the 3rd slave controller 216 updates current clock frequency state information as notified in step 921.

Figure 10:
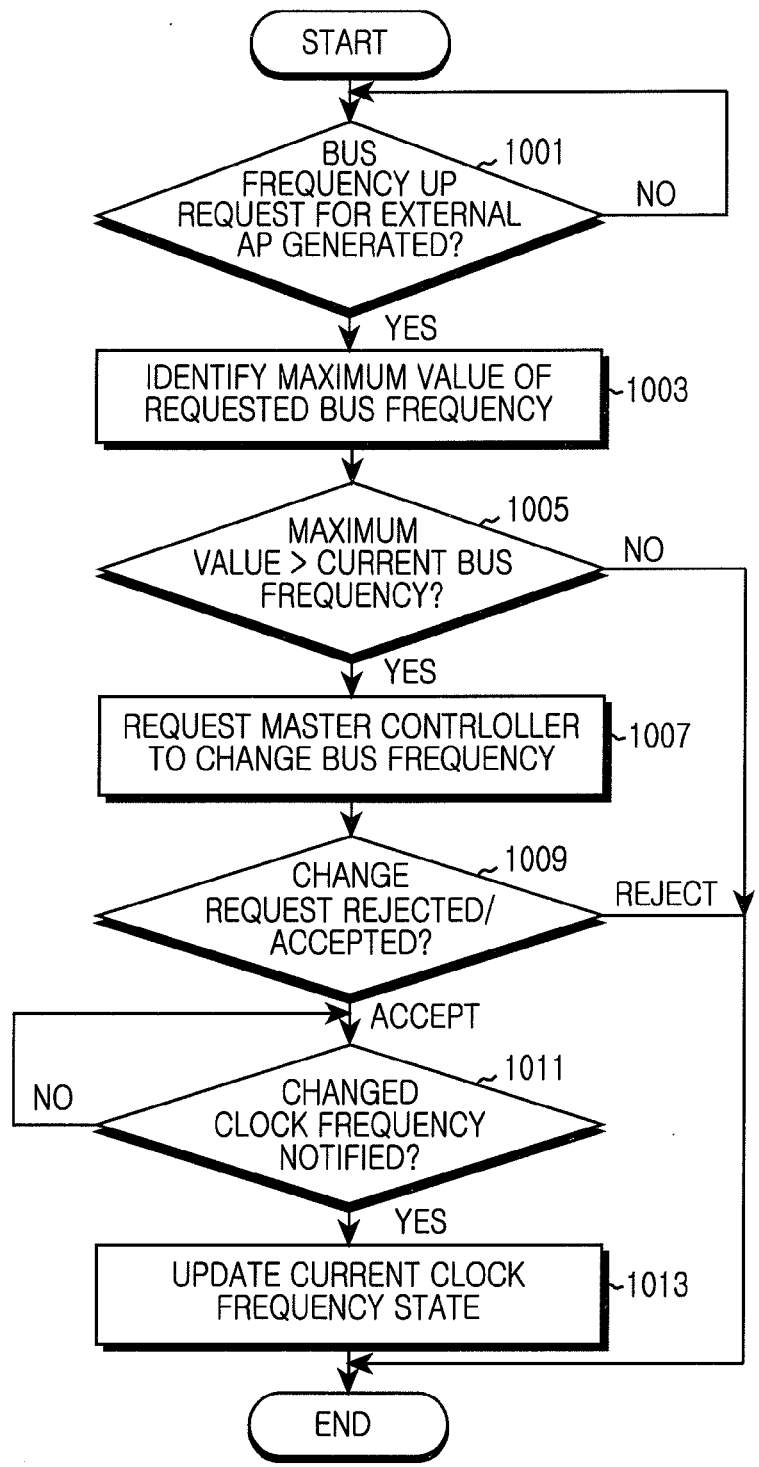
FIG. 10 is a flowchart illustrating an operation procedure of a slave controller for external Application Processor (AP) monitoring of a digital system according to an exemplary embodiment of the present invention.

FIG. 10 illustrates an operation procedure of a 4th slave controller for external AP monitoring of a digital system according to an exemplary embodiment of the present invention.

Referring to FIG. 10, in step 1001, the 4th slave controller 218 determines whether a bus frequency up request for an external AP is generated. The bus frequency up request is generated when an AP using a clock of the bus 140 initiates its operation.

If it is determined in step 1001 that the bus frequency up request for the external AP is generated, the 4th slave controller 218 and determines a maximum value of a requested bus frequency in step 1003. When bus frequency up requests for a plurality of external APs are generated, the 4th slave controller 218 determines a maximum value of requested bus frequencies of each request. If only one request is generated, the maximum value is a requested bus frequency of the one request.

The 4th slave controller 218 determines in step 1005 whether the maximum value is greater than a current bus frequency. If it is determined in step 1005 that the maximum value is less than or is equal to the current bus frequency, there is no need to request for an increase of the bus frequency, so the 4th slave controller 218 terminates the procedure of FIG. 10.

If it is determined in step 1005 that the maximum value is greater than the current bus frequency, the 4th slave controller 218 requests the master controller 220 to increase the bus frequency to the maximum value in step 1007. The 4th slave controller 218 provides the requested bus frequency value together. For example, the 4th slave controller 218 may transmit signals to the master controller 220 requesting for the change of the bus frequency and representing the requested bus frequency.

The 4th slave controller 218 determines whether the bus frequency change request is rejected or accepted. The rejection/acceptance of the change request is determined through an Ack/Nack signal received from the master controller 212. If the change request is accepted, the 4th slave controller 218 determines whether a changed clock frequency is notified. The changed clock frequency includes at least one of a CPU frequency and a bus frequency. If the changed clock frequency is notified, the 4th slave controller 218 updates current clock frequency state information in step 1013 as notified.

Figure 11A:
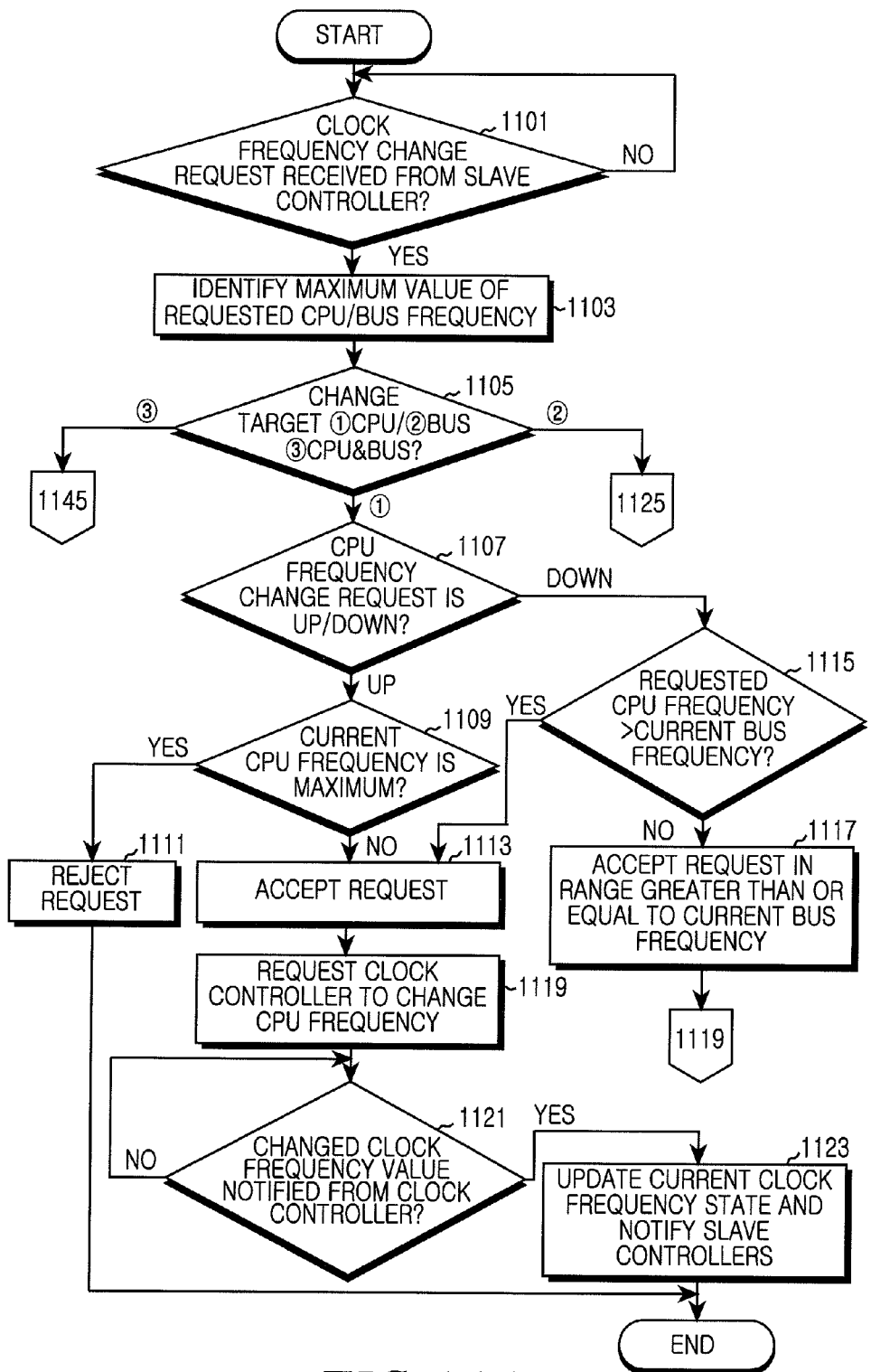
FIGS. 11A to 11C are a flowchart illustrating an operation procedure of a master controller of a digital system according to an exemplary embodiment of the present invention.
Figure 11B:
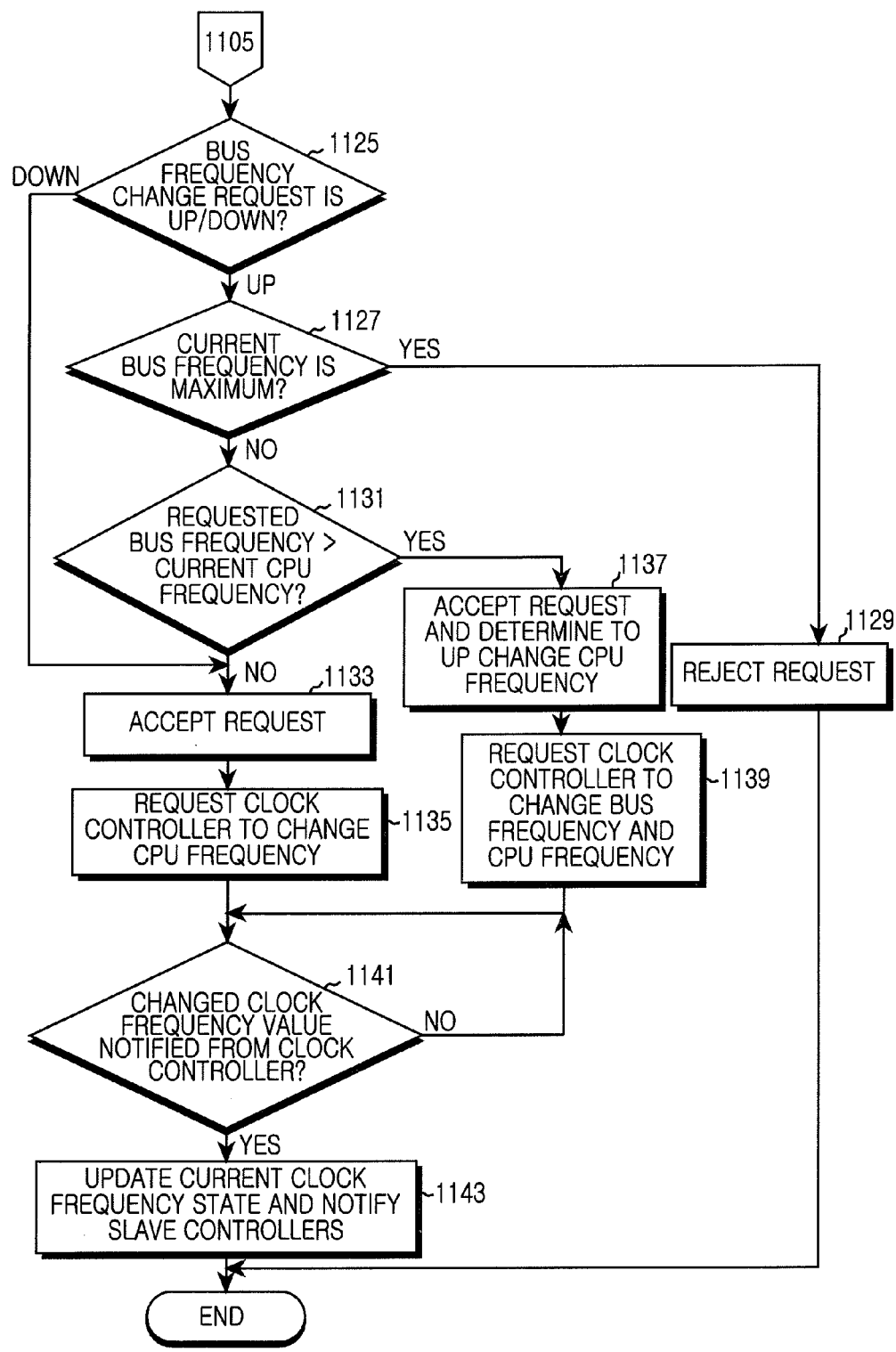
Figure 11C:
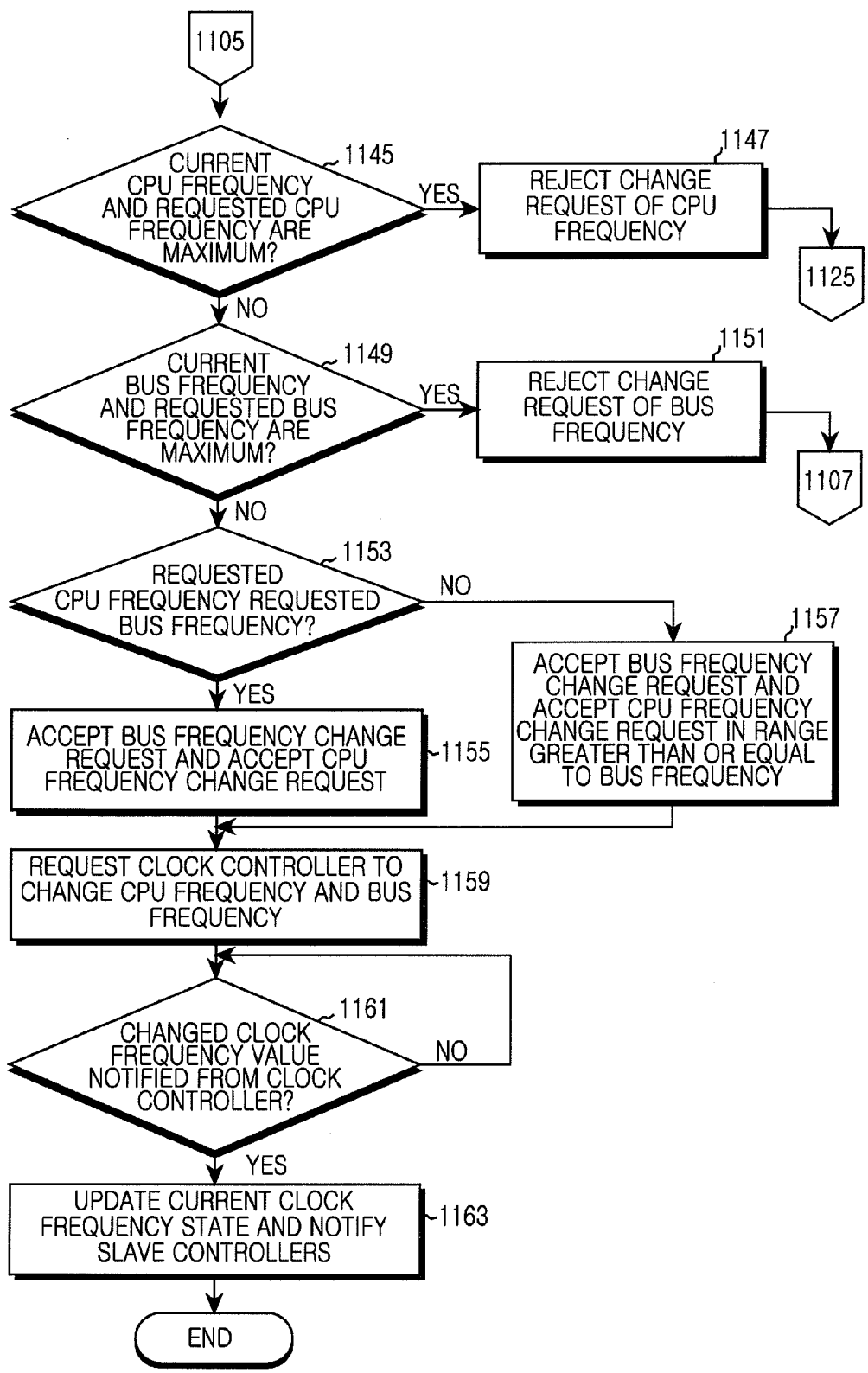

FIGS. 11A to 11C illustrate an operation procedure of a master controller of a digital system according to an exemplary embodiment of the present invention.

Referring to FIGS. 11A to 11C, in step 1101, the master controller 220 determines whether a change request of a clock frequency (i.e., at least one of a CPU frequency and a bus frequency) is received from at least one slave controller.

If at least one clock frequency change request is received, the master controller 220 determines a maximum value of at least one requested CPU frequency and bus frequency. When a plurality of clock frequency change requests are generated, the master controller 220 determines a maximum value of requested CPU/bus frequencies of each request. When both a CPU frequency change request and a bus frequency change request are generated, the master controller 220 determines a maximum value of the requested CPU frequency and a maximum value of the requested bus frequency, respectively. However, when only one request is generated for each of a CPU frequency and a bus frequency, the maximum value is the requested CPU frequency and the requested bus frequency of the one request.

The master controller 220 determines in step 1105 whether a target of the change request is a CPU frequency, a bus frequency, or both the CPU frequency and the bus frequency. If the change request target is the CPU frequency only, the master controller 220 proceeds to step 1107. If the change request target is the bus frequency only, the master controller 220 proceeds to step 1125. If the change request target is both the CPU frequency and the bus frequency, the master controller 220 proceeds to step 1145.

If it is determined in step 1105 that the change request target is the CPU frequency only, the master controller 220 determines in step 1107 whether the CPU frequency change request is for an increase or a decrease. The master controller 220 determines whether a requested CPU frequency is a value greater than a current CPU frequency or a less value.

If it is determined in step 1107 that the CPU frequency change request is an up request, the master controller 220 determines whether the current CPU frequency is a maximum in step 1109. The master controller 220 determines if the CPU frequency can be increased.

If it is determined in step 1109 that the current CPU frequency is the maximum, the master controller 220 rejects an increase request of the CPU frequency in step 1111. The master controller 220 determines not to increase the CPU frequency, and notifies a corresponding slave controller that the change request is rejected. The master controller 220 terminates the procedure of FIG. 11.

If it is determined in step 1109 that the current CPU frequency is not the maximum, the master controller 220 accepts the increase request of the CPU frequency in step 1113. The master controller 220 determines to increase the CPU frequency, and notifies a corresponding slave controller that the change request is accepted.

If it is determined in step 1107 that the change request of the CPU frequency is a down request, the master controller 220 determines in step 1115 whether a requested CPU frequency is greater than or equal to a current bus frequency. Based on a condition that the CPU frequency cannot be less than the bus frequency, the master controller 220 determines whether the requested CPU frequency is within a range meeting the relationship between the CPU frequency and the bus frequency.

If it is determined in step 1115 that the requested CPU frequency is greater than or is equal to the current bus frequency, the master controller 220 and accepts the decrease request of the CPU frequency in step 1113. The master controller 220 determines to decrease the CPU frequency, and notifies a corresponding slave controller that the change request is accepted.

If it is determined in step 1115 that the requested CPU frequency is less than the current bus frequency, the master controller 220 accepts the request within a range greater than or equal to the current bus frequency in step 1117. The master controller 220 determines to decrease the CPU frequency to the same value as the current bus frequency, and notifies a corresponding slave controller that the change request is accepted.

After accepting the change request in step 1113 or step 1117, the master controller 220 requests in step 1119 for a change of the CPU frequency to the clock controller 120 as determined in step 1113 or step 1117. For example, the master controller 220 may transmit signals to the clock controller 120 requesting for the change of the CPU frequency and representing the requested CPU frequency. The master controller 220 determines in step 1121 whether a changed clock frequency value is notified from the clock controller 120. If it is determined in step 1121 that the changed clock frequency value is notified, the master controller 220 updates current clock frequency state information as notified, and notifies slave controllers of the changed clock frequency value in step 1123.

Referring to FIG. 11B, if it is determined in step 1105 that the change request target is the bus frequency only, the master controller 220 determines in step 1125 whether the bus frequency change request is for an increase or a decrease. The master controller 220 determines whether a requested bus frequency is a value greater than or less than a current bus frequency. If it is determined in step 1125 that the bus frequency change request is a down request, the master controller 220 proceeds to step 1133.

If it is determined in step 1125 that the bus frequency change request is an up request, the master controller 220 and determines whether a current bus frequency is a maximum, i.e., whether the current bus frequency can be increased.

If it is determined in step 1127 that the current bus frequency is the maximum, the master controller 220 rejects the increase request of the bus frequency in step 1129. The master controller 220 determines not to increase the bus frequency, and notifies a corresponding slave controller that the change request is rejected. The master controller 220 terminates the procedure of FIG. 11.

If it is determined in step 1127 that the current bus frequency is not the maximum, the master controller 220 determines whether the requested bus frequency is greater than a current CPU frequency in step 1131. Based on a condition that the CPU frequency cannot be less than the bus frequency, the master controller 220 determines whether the requested bus frequency is within a range meeting the relationship between the CPU frequency and the bus frequency.

If it is determined in step 1131 that the requested bus frequency is less than or is equal to the current CPU frequency, the master controller accepts the increase request of the bus frequency in step 1133. The master controller 220 determines to increase the bus frequency to the desired bus frequency, and notifies a corresponding slave controller that the change request is accepted.

The master controller 220 requests the clock controller 120 in step 1135 to increase the bus frequency into the desired bus frequency. For example, the master controller 220 may transmit signals to the clock controller 120 requesting for the change of the bus frequency and representing the requested bus frequency.

If it is determined in step 1131 that the requested bus frequency is greater than the current CPU frequency, the master controller 220 accepts the increase request of the bus frequency in step 1137. The master controller 220 determines to increase the bus frequency to the desired bus frequency, and notifies a corresponding slave controller that the change request is accepted. The master controller 220 determines to increase the CPU frequency. Since the CPU frequency cannot be less than the bus frequency, the master controller 220 determines to increase the CPU frequency according to the increase of the bus frequency.

The master controller 220 requests the clock controller 120 in step 1139 to increase the bus frequency into the desired bus frequency and to increase the CPU frequency into the same value as the desired bus frequency. For example, the master controller 220 may transmits signals to the clock controller 120 requesting for the change of the bus frequency and the CPU frequency, representing the requested bus frequency, and representing the requested CPU frequency.

The master controller 220 determines in step 1141 whether a changed clock frequency value is notified from the clock controller 120. If it is determined in step 1141 that the changed clock frequency value is notified, the master controller 220 updates current clock frequency state information as notified, and notifies slave controllers of the changed clock frequency value in step 1143.

Referring to FIG. 11C, if it is determined in step 1105 that the change request target is both the CPU frequency and the bus frequency, the master controller 220 proceeds to step 1145 and determines whether both a current CPU frequency and a requested CPU frequency are maximum CPU frequencies. If it is determined in step 1145 that both the current CPU frequency and the requested CPU frequency are the maximum CPU frequencies, the master controller 220 rejects an increase request of the CPU frequency in step 1147. The master controller 220 notifies a corresponding slave controller that the change request is rejected. The master controller 220 proceeds to step 1125.

If it is determined in step 1145 that at least one of the current CPU frequency and the requested CPU frequency is not the maximum CPU frequency, the master controller 220 determines whether both a current bus frequency and a requested bus frequency are maximum CPU frequencies. If it is determined in step 1149 that both the current bus frequency and the requested bus frequency are the maximum CPU frequencies, the master controller 220 rejects an increase request of the bus frequency in step 1151. The master controller 220 notifies a corresponding slave controller that the change request is rejected. The master controller 220 proceeds to step 1107.

If it is determined in step 1149 that at least one of the current bus frequency and the requested bus frequency is not the maximum bus frequency, the master controller 220 determines in step 1153 whether a requested CPU frequency is greater than or is equal to a requested bus frequency. Based on a condition that the CPU frequency cannot be less than the bus frequency, the master controller 220 determines whether the requested CPU frequency and the requested bus frequency are within a range meeting the relationship between the CPU frequency and the bus frequency.

If it is determined in step 1153 that the requested CPU frequency is greater than or equal to the requested bus frequency, the master controller 220 accepts a change request of the CPU frequency and a change request of the bus frequency in step 1155. The master controller 220 determines to change the CPU frequency and the bus frequency into the requested CPU frequency and the requested bus frequency, and notifies a corresponding slave controller that the change requests are accepted.

If it is determined in step 1153 that the requested CPU frequency is less than the requested bus frequency, the master controller 220 accepts a change request of the bus frequency in step 1157. The master controller 220 determines to change the bus frequency into the requested bus frequency, and notifies a corresponding slave controller that the change request is accepted. The master controller 220 determines to increase the CPU frequency. Since the CPU frequency cannot be less than the bus frequency, the master controller 220 determines to change the CPU frequency into the same vale as the requested bus frequency.

After determining the change of the CPU frequency and the bus frequency in step 1155 or step 1157, the master controller 220 requests the clock controller 120 in step 1159 for the change of the CPU frequency and the bus frequency as determined in step 1155 or step 1157. For example, the master controller 220 may transmits signals to the clock controller 120 requesting for the change of the CPU frequency and the bus frequency, representing the requested CPU frequency, and representing the requested bus frequency. The master controller 220 determines in step 1161 whether changed clock frequency values are notified from the clock controller 120. If it is determined in step 1161 that the changed clock frequency values are notified, the mater controller 220 updates current clock frequency state information as notified, and notifies slave controllers of the changed clock frequency values in step 1163.

Exemplary embodiments of the present invention may reduce power consumption by adaptively changing clock frequencies of a CPU and a bus in consideration of operation information of the CPU and the bus. Further, exemplary embodiments of the present invention may guarantee the performance of the system and simultaneously induce a power reduction effect, by scaling the clock frequencies of the CPU and the bus based on operation information of a function block and the external.

While the invention has been shown and described with reference to certain preferred embodiments thereof, it will be understood by those skilled in the art that various changes in form and details may be made therein without departing from the spirit and scope of the invention as defined by the appended claims and their equivalents.

What is claimed is:

1. A system including a Central Processing Unit (CPU) and a bus, the system comprising:
   an Adaptive Frequency Scaling (AFS) controller for determining whether to change a clock frequency of the CPU according to operation information of the CPU, and for determining whether to change a clock frequency of the bus according to operation information of the bus; and
   a clock controller for generating the clock frequency of the CPU and the clock frequency of the bus according to the determination of the AFS controller,
   wherein, when the AFS controller determines to increase the clock frequency of the bus into a first value, the AFS controller requests the clock controller to change the clock frequency of the bus to the first value and the clock frequency of the CPU to a value greater than or equal to the first value when the first value is greater than a current clock frequency of the CPU.

2. The system of claim 1, wherein the AFS controller comprises a master controller for, with reference to at least one clock frequency change request from a plurality of slave controllers, determining whether to change the clock frequency of the CPU and the clock frequency of the bus, and
   wherein the plurality of slave controllers comprise:
      a 1st slave controller for determining whether to change the clock frequency of the CPU according to an activity of the CPU, and for requesting a change of the clock frequency of the CPU;
      a 2nd slave controller for determining whether to change the clock frequency of the bus according to an activity of the bus, and for requesting a change of the clock frequency of the bus; and
      a 3rd slave controller for determining whether to change at least one of the clock frequency of the bus and the clock frequency of the CPU based on operation information of at least one function block within the system, and for requesting a change of at least one of the clock frequency of the bus and the clock frequency of the CPU.

3. The system of claim 2, wherein, after generating an activity count value reflecting a length of a time duration during which the CPU is in an idle state, if the activity count value is greater than a predefined up threshold, the 1st slave controller determines to increase the clock frequency of the CPU and, if the activity count value is less than a predefined down threshold, the 1st slave controller determines to decrease the clock frequency of the CPU.

4. The system of claim 3, wherein the active count value is a variable increasing with an increase of the time duration during which the CPU is in the idle state, or a variable increasing with an increase of a time duration during which the CPU is in an active state.

5. The system of claim 4, wherein the activity count value is a value counting an internal clock turned On/Off according to the active/idle state of the CPU.

6. The system of claim 5, wherein the activity count value is a number of the internal clocks counted during a reference time of a predefined one period.

7. The system of claim 3, wherein, before comparing the activity count value with the up threshold and the down threshold, the 1st slave controller selects one up threshold and one down threshold corresponding to a current clock frequency of the CPU among a plurality of up thresholds and a plurality of down thresholds.

8. The system of claim 2, wherein, when there is no operation of the bus during a predefined reference time, the 2nd slave controller requests to decrease the clock frequency of the bus and, if an operation of the bus occurs when a clock frequency is decreased, the 2nd slave controller requests to increase the clock frequency of the bus.

9. The system of claim 8, wherein the 2nd slave controller decreases the clock frequency of the bus by degrees based on three or more clock frequency candidate values.

10. The system of claim 8, wherein the 2nd slave controller increases the clock frequency of the bus by degrees based on three or more clock frequency candidate values.

11. The system of claim 2, wherein, when a module using a clock of the bus among at least one module within the at least one function block begins operating, the 3rd slave controller requests to increase the clock frequency of the bus and, when there is a need to execute Software (S/W), the 3rd slave controller requests to increase the clock frequency of the CPU.

12. The system of claim 11, wherein, when a plurality of clock frequency change requests are generated from the at least one function block, the 3rd slave controller requests to increase to a maximum value of the requested clock frequency values.

13. The system of claim 2, wherein the system is a System on a Chip (SoC), and
wherein the plurality of slave controllers further comprise a 4th slave controller for, after selecting the clock frequency of the bus desired for an operation of an Application Processor (AP) of the SoC, if the selected clock frequency is greater than a current clock frequency of the bus, requesting the master controller to increase the clock frequency of the bus into the selected clock frequency.

14. The system of claim 2, wherein, if a plurality of clock frequency change requests are generated, the master controller determines collision or non-collision between the clock frequency change requests and, if the collision occurs, the master controller rejects at least one of the clock frequency change requests.

15. The system of claim 14, wherein, when both a decrease request of the clock frequency of the CPU and a change request of the clock frequency of the bus are generated, if a requested clock frequency of the bus is greater than or is equal to a current clock frequency of the CPU, the master controller determines that the clock frequency of the CPU cannot be decreased, and notifies the slave controller, which has requested to decrease the clock frequency of the CPU, that the request is rejected.

16. The system of claim 2, wherein, if a change of at least one of the clock frequency of the CPU and the clock frequency of the bus is notified from the clock controller, the master controller stores a changed value of at least one of the clock frequency of the CPU and the clock frequency of the bus, and notifies the plurality of slave controllers of a changed value of at least one of the clock frequency of the CPU and the clock frequency of the bus.

17. The system of claim 16, wherein the plurality of slave controllers store the changed value of at least one of the clock frequency of the CPU and the clock frequency of the bus notified from the master controller.

18. An operation method of a digital system having a Central Processing Unit (CPU) and a bus, the method comprising:
determining whether to change a clock frequency of the CPU according to operation information of the CPU;
determining whether to change a clock frequency of the bus according to operation information of the bus;
when determining to increase the clock frequency of the bus to a first value, determining whether the first value is greater than a current clock frequency of the CPU; and
changing the clock frequency of the bus to the first value and changing the clock frequency of the CPU to a value greater than or equal to the first value when the first value is greater than the current clock frequency of the CPU.

19. The method of claim 18, wherein the determining of whether to change the clock frequency of the CPU comprises:
generating an activity count value reflecting a length of a time duration during which the CPU is in an idle state;
if the activity count value is greater than a predefined up threshold, determining to increase the clock frequency of the CPU; and
if the activity count value is less than a predefined down threshold, determining to decrease the clock frequency of the CPU.

20. The method of claim 19, wherein the active count value is a variable increasing with an increase of the time duration during which the CPU is in the idle state, or a variable increasing with an increase of a time duration during which the CPU is in an active state.

21. The method of claim 20, wherein the activity count value is a value counting an internal clock turned On/Off according to the active/idle state of the CPU.

22. The method of claim 21, wherein the activity count value is a number of the internal clocks counted during a reference time of a predefined one period.

23. The method of claim 19, wherein the determining of whether to change the clock frequency of the CPU comprises:
before comparing the activity count value with the up threshold and the down threshold, selecting one up threshold and one down threshold corresponding to a current clock frequency of the CPU among a plurality of up thresholds and a plurality of down thresholds.

24. The method of claim 18, wherein the determining of whether to change the clock frequency of the bus comprises:
when there is no operation of the bus during a predefined reference time, determining to decrease the clock frequency of the bus; and
if an operation of the bus occurs when a clock frequency is decreased, determining to increase the clock frequency of the bus.

25. The method of claim 24, wherein the decrease of the clock frequency of the bus is performed by degrees based on three or more clock frequency candidate values.

26. The method of claim 24, wherein the increase of the clock frequency of the bus is performed by degrees based on three or more clock frequency candidate values.

27. The method of claim 18, further comprising:
determining whether to change at least one of the clock frequency of the bus and the clock frequency of the CPU based on operation information of at least one function block within the digital system; and
changing at least one of the clock frequency of the bus and the clock frequency of the CPU.

28. The method of claim 27, wherein the determining of whether to change the at least one of the clock frequency of the bus and the clock frequency of the CPU based on the operation information of the at least one function block within the digital system comprises:
when a module using a clock of the bus among at least one module within the at least one function block begins operating, determining to increase the clock frequency of the bus; and
when there is a need to execute Software (S/W), determining to increase the clock frequency of the CPU.

29. The method of claim 28, wherein the determining of whether to change the at least one of the clock frequency of the bus and the clock frequency of the CPU based on the operation information of the at least one function block within the digital system comprises
when a plurality of clock frequency change requests are generated from the at least one function block, determining to increase to a maximum value of the requested clock frequency values.

30. The method of claim 18, wherein the digital system is a System on a Chip (SoC), and
wherein the method further comprises:
selecting the clock frequency of the bus desired for an operation of an Application Processor (AP) of the SoC; and
if the selected clock frequency is greater than a current clock frequency of the bus, changing the clock frequency of the bus to the selected clock frequency.

31. The method of claim 18, further comprising, if a plurality of clock frequency change requests are generated and if a collision between the plurality of clock frequency change requests occurs, rejecting at least one of the clock frequency change requests.

32. The method of claim 31, wherein the rejecting of at least one of the clock frequency change requests comprises:
when both a decrease request of the clock frequency of the CPU and a change request of the clock frequency of the bus are generated, if a requested clock frequency of the bus is greater than or equal to a current clock frequency of the CPU, determining that the clock frequency of the CPU cannot be decreased; and
rejecting a decrease request of the clock frequency of the CPU.

33. The method of claim 18, further comprising, if a change of at least one of the clock frequency of the CPU and the clock frequency of the bus is completed, storing a changed value of at least one of the clock frequency of the CPU and the clock frequency of the bus.

* * * * *